US011563502B2

(12) United States Patent
Shen et al.

(10) Patent No.: US 11,563,502 B2
(45) Date of Patent: Jan. 24, 2023

(54) METHOD AND USER EQUIPMENT FOR A SIGNAL RECEPTION

(71) Applicant: SAMSUNG ELECTRONICS CO., LTD., Suwon-si (KR)

(72) Inventors: Songhui Shen, Beijing (CN); He Wang, Beijing (CN); Yiyan Zhang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 16/952,538

(22) Filed: Nov. 19, 2020

(65) Prior Publication Data

US 2021/0167875 A1   Jun. 3, 2021

(30) Foreign Application Priority Data

Nov. 29, 2019 (CN) .......................... 201911203711.8

(51) Int. Cl.
*H04B 17/318* (2015.01)
*H04W 16/28* (2009.01)

(52) U.S. Cl.
CPC .......... *H04B 17/318* (2015.01); *H04W 16/28* (2013.01)

(58) Field of Classification Search
CPC .. H04B 17/318; H04B 17/327; H04B 7/0408; H04B 7/088; H04B 7/0814; H04W 16/28
See application file for complete search history.

(56) References Cited

U.S. PATENT DOCUMENTS

| 2016/0043792 | A1* | 2/2016 | Jeong ................... H04B 7/0862 370/328 |
| 2018/0123648 | A1* | 5/2018 | Nagaraja ................. H04B 7/06 |
| 2018/0332483 | A1* | 11/2018 | Yoon ..................... H04W 24/08 |
| 2018/0351630 | A1 | 12/2018 | Nilsson et al. |
| 2019/0007117 | A1 | 1/2019 | Kim et al. |
| 2019/0044584 | A1 | 2/2019 | Lee et al. |
| 2019/0159102 | A1 | 5/2019 | Ryu et al. |
| 2019/0191411 | A1 | 6/2019 | Petersson et al. |
| 2020/0364571 | A1* | 11/2020 | Xu .......................... G06N 5/003 |
| 2021/0027018 | A1* | 1/2021 | Lin .......................... G06N 3/08 |
| 2021/0056708 | A1* | 2/2021 | Li ............................ G06T 7/187 |

(Continued)

FOREIGN PATENT DOCUMENTS

KR   10-2020-0061808 A   6/2020
WO   2019190368 A1   10/2019

OTHER PUBLICATIONS

International Search Report (PCT/ISA/210) and Written Opinion (PCT/ISA/237) issued by the International Searching Authority in International Application No. PCT/KR2020/015962, dated Feb. 22, 2021.

(Continued)

*Primary Examiner* — Derrick W Ferris
*Assistant Examiner* — Mohammed M Murshid
(74) *Attorney, Agent, or Firm* — Sughrue Mion, PLLC

(57) ABSTRACT

A method of signal reception performed by a user equipment (UE), including receiving a reference signal by at least two measuring beams; determining at least two reference signal received power (RSRP) values measured by the at least two measuring beams; processing the at least two RSRP values measured by the at least two measuring beams as at least two data tables; and performing the signal reception according to the at least two data tables.

18 Claims, 22 Drawing Sheets

(56) References Cited

U.S. PATENT DOCUMENTS

2021/0195544 A1\* 6/2021 Awad .................. H04B 7/088
2022/0029286 A1  1/2022 Cho et al.

OTHER PUBLICATIONS

Intel Corporation, "Summary of discussion for NR measurements for mobility", 3GPP TSG RAN WG1 Meeting #94, R1-1809732, Aug. 20-24, 2018, Gothenburg, Sweden, pp. 1-20 (20 pages total).
3rd Generation Partnership Project; Technical Specification Group Radio Access Network; NR; Physical Tayer procedures for control (Release 15); 3GPP TS 38.213, V15.5.0, Mar. 2019; pp. 1-104.
3rd Generation Partnership Project; Technical Specification Group Radio Access Network; NR; Medium Access Control (MAC) protocol specification (Release 15); 3GPP TS 38.321, V15.5.0, Mar. 2019, pp. 1-78.
Communication dated Sep. 14, 2022 issued by the European Patent Office in application No. 20893826.6.

\* cited by examiner

METHOD AND USER EQUIPMENT FOR A SIGNAL RECEPTION

CROSS-REFERENCE TO THE RELATED APPLICATION(S)

This application is based on and claims priority under 35 U.S.C. § 119(a) to Chinese Patent Application No. 201911203711.8, filed on Nov. 29, 2019 in the China National Intellectual Property Administration, the disclosure of which is incorporated by reference herein in its entirety.

BACKGROUND

1. Field

The disclosure relates to the technical field of wireless communication and in particular to a method of signal reception, a user equipment, an electronic device and a computer storage medium.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system may also be called a 'beyond 4G network' or a 'post long term evolution (LTE) system'. The 5G communication system is considered to be implemented in higher frequency (mmWave) bands, e.g., 60 giga-Hertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which may be a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as technologies connectivity network where humans generate and consume information, is now evolving to the Internet of things (IoT) where the cloud server has IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

SUMMARY

Provided are a method and apparatus capable of effectively providing a service in a mobile communication system. Also, provided are a method and apparatus for signal reception.

Embodiments of the present application aim at providing the following technical solutions in order to at least solve one of the above technical defects.

Additional aspects will be set forth in part in the description which follows and, in part, will be apparent from the description, or may be learned by practice of the presented embodiments.

In one aspect, a method of signal reception is provided, comprising: receiving, by a user equipment UE, reference signal respectively by at least two measuring beams, and determining a reference signal received power (RSRP) value measured by each measuring beam, processing the RSRP value measured by each measuring beam as a respective data table, and performing the signal reception according to the data table.

In one possible implementation, at least two measuring beams are determined from receiving beams for the UE based on distribution of beams for the UE and a preset selection rule, or the at least two measuring beams are determined from receiving beams for the UE according to received configuration information.

In one possible implementation, determining at least two measuring beams from receiving beams for the UE based on distribution of beams for the UE and a preset selection rule comprises at least one of the following: determining, from receiving beams for the UE, at least two measuring beams that are uniformly distributed in various directions of the entire spherical space centered on antenna array for the UE, and determining, from receiving beams for the UE, at least two measuring beams that are close to a normal direction of the antenna array for the UE.

In one possible implementation, receiving, by the UE, reference signal respectively by at least two measuring beams, comprises: receiving the reference signal successively by the at least two measuring beams in accordance with a fixed receiving order or non-fixed receiving order of the at least two measuring beams.

In one possible implementation, the reference signal comprises at least one of the following: a synchronization signal in a synchronization signal block, and a channel state information reference signal.

In one possible implementation, processing the RSRP value measured by each measuring beam as a respective data table comprises: for each measuring beam, determining a numerical value for each cell in the respective data table according to the RSRP value measured by the each measuring beam.

In one possible implementation, determining a numerical value for each cell in the respective data table according to the RSRP value measured by the each measuring beam comprises: in the respective data table for the each measuring beam, using the RSRP value measured by the each measuring beam as the numerical value for a first cell corresponding to a receiving direction of the each measuring beam, determining, according to the RSRP value measured by the each measuring beam, a numerical value for a second cell in the data table, the second cell corresponding to other directions except for the receiving direction of the each measuring beam, and rows in the data table corresponding to vertical angles and columns in the data table corresponding to horizontal angles, or, rows in the data table corresponding to horizontal angles and columns in the data table corresponding to vertical angles.

In one possible implementation, the steps of, in the respective data table for the each measuring beam, using the RSRP value measured by the each measuring beam as the numerical value for a first cell corresponding to a direction of the each measuring beam, and determining, according to the RSRP value measured by the each measuring beam, a numerical value for a second cell in the data table comprise: determining the size of the data table, determining the respective first cell in the data table according to a vertical angle and a horizontal angle in the receiving direction of the each measuring beam, and using the RSRP value measured by the each measuring beam as the numerical value for the first cell, and based on a preset distribution pattern, determining numerical values for the second cell in the data table according to the RSRP value measured by the each measuring beam, a difference between a vertical angle for the second cell and the vertical angle in the receiving direction of the each measuring beam, a difference between a horizontal angle for the second cell and the horizontal angle in the receiving direction of the each measuring beam, and preset beam offset.

In one possible implementation, determining a numerical value for each cell in the respective data table according to the RSRP value measured by the each measuring beam comprises: determining an initial data table corresponding to the each measuring beam, and updating, according to the RSRP value measured by the each measuring beam, an initial numerical value for the first cell in the initial data table and an initial numerical value for the second cell in the initial data table, wherein, the first cell is a cell, corresponding to the receiving direction of the each measuring beam, in the initial data table, and the initial numerical value for the first cell is a predetermined numerical value, and the second cell is a cell, corresponding to other directions except for the receiving direction of the each measuring beam, in the initial data table, and the initial numerical value for the second cell is a numerical value determined according to the predetermined numerical value, the difference between the vertical angle for the second cell and the vertical angle for the first cell, the difference between the horizontal angle for the second cell and the horizontal angle for the first cell, and the preset beam offset.

In one possible implementation, setting beam offset comprises: determining, according to the receiving beams for the UE, an average of included angles between beam center directions of each two adjacent receiving beams, and using half of the average as the beam offset.

In one possible implementation, updating, according to the RSRP value measured by each measuring beam, an initial numerical value for the first cell in the initial data table and an initial numerical value for the second cell in the initial data table comprises: increasing the initial numerical value for the first cell in the initial data table and the initial numerical value for the second cell in the initial data table by the RSRP value measured by the each measuring beam, respectively.

In one possible implementation, the first cell is a central point of the preset distribution pattern, and the preset distribution pattern comprises Gaussian distribution.

In one possible implementation, performing the signal reception according to the data table comprises: determining a prediction result according to the data table, and performing signal reception according to the prediction result, wherein, the determining a prediction result comprises at least one of the following: determining an optimal receiving beam, determining whether a currently activated receiving beam is in a mismatched state, determining whether to switch the receiving beam, determining the index of a receiving beam to switch to, determining to switch the receiving beam at a predetermined moment, and transmitting, to a base station, a set of candidates of optimal transmitting beams.

In one possible implementation, determining a prediction result according to the data table comprises: determining a prediction result by a predetermined prediction network, according to the data table.

In one possible implementation, a predetermined prediction network comprises a combined network of a convolutional neural network model and a recurrent neural network model, the recurrent neural network model comprising a long short-term memory network model.

In one possible implementation, when the UE is configured with a plurality of component carriers: receiving, by the UE, reference signal respectively by at least two measuring beams, and determining a RSRP value measured by each measuring beam comprise: for each component carrier, receiving, by the UE, a reference signal for each component carrier respectively by at least two measuring beams corresponding to the each component carrier, and determining a RSRP value measured by each measuring beam, the processing the RSRP value measured by each measuring beam as a respective data table comprises: for each component carrier, processing the RSRP value measured by each measuring beam corresponding to each component carrier into a respective data table, respectively, performing the signal reception according to the data table comprises: determining a prediction result according to the data table for each component carrier corresponding to each measuring beam, and performing the signal reception according to the prediction result.

In one possible implementation, each component carrier corresponds to one channel of a predetermined prediction network, and determining a prediction result according to the data table for each component carrier corresponding to each measuring beam comprises: receiving, by channels respectively corresponding to the component carriers of the predetermined prediction network, a data table for each component carrier corresponding to each measuring beam, and obtaining a respective prediction result according to the data table.

In one possible implementation, the UE receives a plurality of reference signals transmitted respectively by a plurality of transmitting beams: receiving, by the UE, reference signal respectively by at least two measuring beams, and determining a RSRP value measured by each measuring beam comprise: for each transmitting beam, receiving, by the UE, a reference signal transmitted from each transmitting beam by at least two measuring beams corresponding to each transmitting beam, and determining a RSRP value measured by each measuring beam: the processing the RSRP value measured by each measuring beam into a respective data table comprises: for each transmitting beam, processing the RSRP value measured by each measuring beam corresponding to each transmitting beam as a respective data table, respectively, performing the signal reception according to the data table comprises: determining a prediction result according to the data table for each transmitting beam corresponding to each measuring beam, and performing the signal reception according to the prediction result.

In one possible implementation, each transmitting beam corresponds to one channel of a predetermined prediction network, and determining a prediction result according to the data table for each transmitting beam corresponding to each measuring beam comprises: receiving, by channels respectively corresponding to the transmitting beams of the predetermined prediction network, a data table for each transmitting beam corresponding to each measuring beam, and obtaining a prediction result for each transmitting beam according to the data table for each transmitting beam.

In one possible implementation, the prediction result comprises at least one of the following: the RSRP value for each receiving beam for the UE, received respectively on at least one transmitting beam, the ranking result of the RSRP value for each receiving beam for the UE, received respectively on at least one transmitting beam, the RSRP value for each receiving beam for the UE, the ranking result of the RSRP value for each receiving beam for the UE, a set of candidates of optimal receiving beams, and a set of candidates of optimal transmitting beams.

In an aspect, a user equipment, comprising: a first determination module, configured to receive reference signal respectively by at least two measuring beams, and determine a RSRP value measured by each measuring beam, a processing module, configured to process the RSRP value measured by each measuring beam as a respective data table, and a receiving module, configured to perform signal reception according to the data table.

In one possible implementation, at least two measuring beams are determined from receiving beams for the UE based on distribution of beams for the UE and a preset selection rule, or the at least two measuring beams are determined from receiving beams for the UE according to received configuration information.

In one possible implementation, when determining at least two measuring beams from receiving beams for the UE based on distribution of beams for the UE and a preset selection rule, the first determination module is configured to execute at least one of the following: determining, from receiving beams for the UE, at least two measuring beams that are uniformly distributed in various directions of the entire spherical space centered on antenna array for the UE, and determining, from receiving beams for the UE, at least two measuring beams that are close to a normal direction of the antenna array for the UE.

In one possible implementation, when receiving reference signals transmitted from transmitting beams respectively by at least two measuring beams, the first determination module is specifically configured to: receive the reference signals successively by the at least two measuring beams in accordance with a fixed receiving order or non-fixed receiving order of the at least two measuring beams.

In one possible implementation, the reference signal comprises at least one of the following: a synchronization signal in a synchronization signal block, and a channel state information reference signal.

In one possible implementation, the processing module is specifically configured to: for each measuring beam, determine a numerical value for each cell in the respective data table according to the RSRP value measured by the each measuring beam.

In one possible implementation, when determining a numerical value for each cell in the respective data table according to the RSRP value measured by the each measuring beam, the processing module is specifically configured to: in the respective data table for the each measuring beam, use the RSRP value measured by the each measuring beam as the numerical value for a first cell corresponding to a receiving direction of the each measuring beam, determine, according to the RSRP value measured by the each measuring beam, a numerical value for a second cell in the data table, the second cell corresponding to other directions except for the receiving direction of the each measuring beam, and rows in the data table corresponding to vertical angles and columns in the data table corresponding to horizontal angles, or, rows in the data table corresponding to horizontal angles and columns in the data table corresponding to vertical angles.

In one possible implementation, when, in the respective data table for the each measuring beam, using the RSRP value measured by the each measuring beam as the numerical value for a first cell corresponding to a direction of the each measuring beam, and determining, according to the RSRP value measured by the each measuring beam, a numerical value for a second cell in the data table, the processing module is specifically configured to: determining the size of the data table, determining the respective first cell in the data table according to a vertical angle and a horizontal angle in the receiving direction of the each measuring beam, and use the RSRP value measured by the each measuring beam as the numerical value for the first cell, and determining, based on a preset distribution pattern, the numerical value for the second cell in the data table according to the RSRP value measured by the each measuring beam, a difference between a vertical angle for the second cell and the vertical angle in the receiving direction of the each measuring beam, a difference between a horizontal angle for the second cell and the horizontal angle in the receiving direction of the each measuring beam, and preset beam offset.

In one possible implementation, when determining a numerical value for each cell in the respective data table according to the RSRP value measured by the each measuring beam, the processing module is specifically configured to: determine an initial data table corresponding to the each measuring beam, and update, according to the RSRP value measured by the each measuring beam, an initial numerical value for the first cell in the initial data table and an initial numerical value for the second cell in the initial data table, wherein, the first cell is a cell, corresponding to the receiving direction of the each measuring beam, in the initial data table, and the initial numerical value for the first cell is a predetermined numerical value, and the second cell is a cell, corresponding to other directions except for the receiving direction of the each measuring beam, in the initial data table, and the initial numerical value for the second cell is a numerical value determined according to the predetermined numerical value, the difference between the vertical angle for the second cell and the vertical angle for the first cell, the difference between the horizontal angle for the second cell and the horizontal angle for the first cell, and the preset beam offset.

In one possible implementation, the device further comprises a determination module configured to determine beam offset, when determining beam offset, the determination module is specifically configured to: determine, according to the receiving beams for the UE, an average of included angles between beam center directions of each two adjacent receiving beams, and use half of the average as the beam offset.

In one possible implementation, when updating, according to the RSRP value measured by the each measuring beam, an initial numerical value for the first cell in the initial data table and an initial numerical value for the second cell in the initial data table, the processing module is configured to increase the initial numerical value for the first cell in the initial data table and the initial numerical value for the second cell in the initial data table by the RSRP value measured by the each measuring beam, respectively.

In one possible implementation, the first cell is a central point of the preset distribution pattern, and the preset distribution pattern comprises Gaussian distribution.

In one possible implementation, the receiving module is configured to determine a prediction result according to the data table, and perform signal reception according to the prediction result, wherein, determining a prediction result comprises at least one of the following: determining an optimal receiving beam, determining whether a currently activated receiving beam is in a mismatched state, determining whether to switch the receiving beam, determining the index of a receiving beam to switch to, determining to switch the receiving beam at a predetermined moment, and transmitting, to a base station, a set of candidates of optimal transmitting beams.

In one possible implementation, when determining a prediction result according to the data table, the receiving module is configured to determine a prediction result by a predetermined prediction network, according to the data table.

In one possible implementation, a predetermined prediction network comprises a combined network of a convolutional neural network model and a recurrent neural network model, the recurrent neural network model comprising a long short-term memory network model.

In one possible implementation, when the UE is configured with a plurality of component carriers: the first determination module is specifically configured to: for each component carrier, receive, by the UE, a reference signal for each component carrier respectively by at least two measuring beams corresponding to the each component carrier, and determine a RSRP value measured by each measuring beam, the processing module is specifically configured to: for each component carrier, processing the RSRP value measured by each measuring beam corresponding to each component carrier as a respective data table, and the receiving module is specifically configured to: determine a prediction result according to the data table for each component carrier corresponding to each measuring beam, and perform signal reception according to the prediction result.

In one possible implementation, each component carrier corresponds to one channel of a predetermined prediction network, and when determining a prediction result according to the data table for each component carrier corresponding to each measuring beam, the receiving module is configured to receive, by channels respectively corresponding to the component carriers of the predetermined prediction network, a data table for each component carrier corresponding to each measuring beam, and obtain a respective prediction result according to the data table.

In one possible implementation, the UE receives a plurality of reference signals transmitted respectively by a plurality of transmitting beams, the first determination module is specifically configured to: for each transmitting beam, receive, by the UE, a reference signal transmitted from each transmitting beam by at least two measuring beams corresponding to each transmitting beam, and determine a RSRP value measured by each measuring beam, the processing module is specifically configured to: for each transmitting beam, process the RSRP value measured by each measuring beam corresponding to each transmitting beam as a respective data table, the receiving module is specifically configured to: determine a prediction result according to the data table for each transmitting beam corresponding to each measuring beam, and perform signal reception according to the prediction result.

In one possible implementation, each transmitting beam corresponds to one channel of a predetermined prediction network, and when determining a prediction result according to the data table for each transmitting beam corresponding to each measuring beam, the receiving module is configured to receive, by channels respectively corresponding to the transmitting beams of the predetermined prediction network, a data table for each transmitting beam corresponding to each measuring beam, and obtain a prediction result for each transmitting beam according to the data table for each transmitting beam.

In one possible implementation, the prediction result comprises at least one of the following: the RSRP value for each receiving beam for the UE, received respectively on at least one transmitting beam, the ranking result of the RSRP value for each receiving beam for the UE, received respectively on at least one transmitting beam, the RSRP value for each receiving beam for the UE, the ranking result of the RSRP value for each receiving beam for the UE, a set of candidates of optimal receiving beams, and a set of candidates of optimal transmitting beams.

In an aspect, an electronic device is provided, comprising a memory, a processor, and a computer program stored in the memory and can be run on the processor, wherein the program, when executed by the processor, causes the processor to perform the method of signal reception described above.

In an aspect, a computer-readable storage medium is provided, storing a computer program that, when executed by a processor, causes the processor to perform the method of signal reception described above.

By the signal receiving method provided in embodiments, by processing the RSRP value measured by a measuring beam as a respective data table, the amplitude information of the measured RSRP can be utilized, and the spatial direction information of measuring beams can also be utilized well. In this way, optimal receiving beam can be determined and signal reception can be well performed, based on the RSRP values measured by partial receiving beams as well as the spatial position relation between the measuring beams, so as to maintain good communication link quality and ensure high-quality signal transmission.

BRIEF DESCRIPTION OF THE DRAWINGS

The above and/or additional aspects and advantages of the embodiments will become apparent and be readily understood from the following description of embodiments with reference to the accompanying drawings, in which.

DETAILED DESCRIPTION

Figure 1:
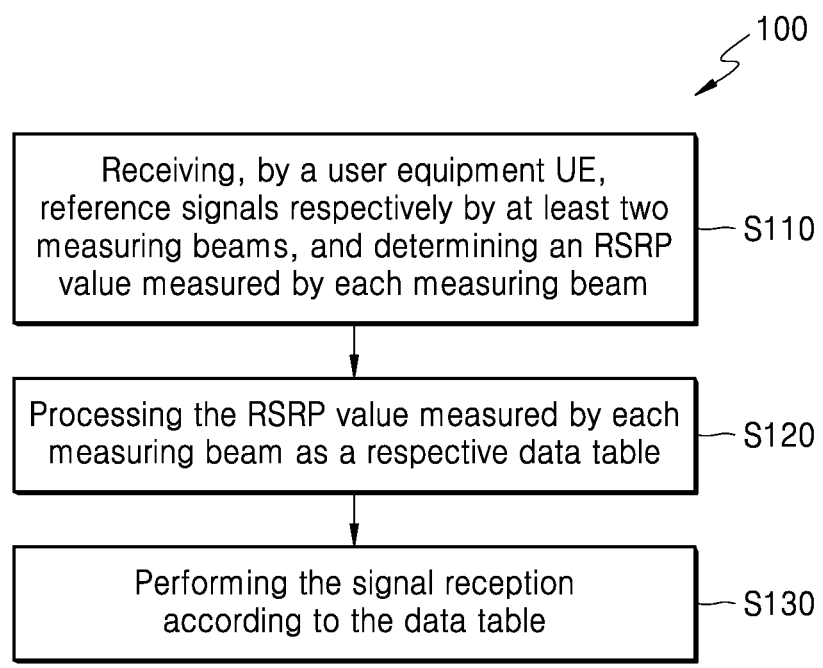
FIG. 1 is a schematic flowchart of a method of signal reception according to embodiments.

Embodiments will be described below in detail. The examples of these embodiments have been illustrated in the drawings throughout which same or similar reference numerals refer to same or similar elements or elements having same or similar functions. The embodiments described with reference to the drawings are illustrative, merely used for explaining the present application and should not be regarded as any limitations thereto.

It should be understood by a person of ordinary skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

To make the objectives, technical solutions and advantages of the embodiments of the present applicant clearer, the implementations of the disclosure will be further described below in detail with reference to the accompanying drawings.

Examples of technical solutions of the embodiments and how to solve the above technical problems by the technical solutions of the embodiments will be described below in detail. The specific embodiments to be described below may be combined, and the same or similar concepts or processes may be not repeated in some embodiments. The embodiments will be described below with reference to the accompanying drawings.

In mobile communication systems, with the increasing demands of users for high data transmission rates, the systems require larger bandwidth as well as higher frequency bands. In the fifth generation (5G) mobile communication systems, the millimeter wave (mm-wave) bands will be widely used to provide high-speed transmission.

Because the propagation path loss in the millimeter-wave bands is significantly higher than that in previous low frequency bands, high-gain beamforming may be used to compensate for the high path loss. The formed beam may have the characteristics of high gain, high directivity, and narrow beamwidth. The beam may have a low coverage in the three-dimensional space, and the performance of the beam may drop sharply once it leaves this high gain range. Therefore, multiple beams may be used on both transmitter and receiver sides to cover the entire three-dimensional space as much as possible, in order to ensure that there are appropriate beams in each direction to generate a high signal gain. Meanwhile, methods may be used to select appropriate beams for transmission or reception.

Due to the characteristics of mobile communication, the environment in which the user equipment UE is located may change, for example, the rotation of the user equipment itself, the change of its own location, and the change of the surrounding environment, such as being shielded by obstacles. Such change may degrade the signal quality of the current in-use beam on the UE, so that it is unable to maintain high transmission performance, or even link connection failure may occur, for example due to a beam mismatch. In this case, the UE needs to identify the beam mismatch as early as possible, and find other better beams for beam reselection, so as to reduce the possibility of link failure.

A related-art method to solve this problem is the naïve receiving beam sweeping. This method periodically triggers the receiving beam sweeping. That is, all receiving beams are traversed successively to measure the power of reference signals from the transmitting beam, and then using the beam with maximum power as the receiving beam for data transmission at the next moment.

However, this method present several problems. First, the entire beam sweeping process is quite time-consuming, resulting in large beam selection delay. Moreover, because of this beam selection delay, the optimal beam may be changed when beam sweeping is finished. That is, the optimal beam selected from beam sweeping may no longer be the optimal one at the current moment, eventually leading to low beam selection accuracy and low beam transmission performance.

Therefore, in view of the shortcomings and problems of the above related-art method, it is necessary to provide effective technical solutions to improve the receiving beam selection accuracy for the UE and improve the beam transmission performance in the millimeter wave system.

FIG. 1 is a schematic flowchart of a method of signal reception according to embodiments.

An embodiment provides a method of signal reception. As shown in FIG. 1, the method 100 includes, at operation S110, receiving, by the user equipment UE, reference signals respectively by at least two measuring beams, and determining a reference signal received power (RSRP) value measured by each measuring beam. At operation S120, the method 100 includes processing the RSRP value measured by each measuring beam as a respective data table. At operation S130, the method 100 includes performing the signal reception according to the data table.

By signal receiving methods provided in embodiments, by processing the RSRP value measured by a measuring beam into a respective data table, the amplitude information of the measured RSRP can be utilized, and the spatial direction information of measuring beams can also be utilized well. In this way, optimal receiving beam can be determined and signal reception can be well performed, based on the RSRP values measured by partial receiving beams as well as the spatial position relation between the measuring beams, so as to maintain good communication link quality and ensure high-quality signal transmission.

In embodiments, receiving, by the UE, reference signals transmitted from a transmitting beam respectively by at least two measuring beams, may mean receiving reference signals transmitted from one transmitting beam of a base station respectively by at least two measuring beams, or may mean receiving reference signals transmitted from at least two component carriers (CCs), which are configured for base station operation according to actual requirements, respectively by at least two measuring beams, or may be receiving reference signals transmitted from at least two transmitting beams of a base station respectively by at least two measuring beams.

The steps of example methods of signal reception will be described below in detail with reference to specific embodiments.

Example 1

Examples of steps S110-S130 of the method 100 of signal reception in the above embodiment will be specifically described below by using, as an example, the case where the UE receives reference signals transmitted from one transmitting beam of a base station respectively by at least two measuring beams.

1. Example Implementation of the Step S110

An example of step S110 will be specifically described below by the following embodiment.

In one possible implementation, at least two measuring beams are determined from receiving beams for the UE based on distribution of beams for the UE and a preset selection rule; or the at least two measuring beams are determined from receiving beams for the UE according to received configuration information.

Specifically, determining at least two measuring beams from receiving beams for the UE based on distribution of beams for the UE and a preset selection rule may include at least one of the following: determining, from receiving beams for the UE, at least two measuring beams that are uniformly distributed in various directions of the entire spherical space centered on antenna array for the UE; and determining, from receiving beams for the UE, at least two measuring beams that are close to a normal direction of the antenna array for the UE.

Specifically, receiving, by the UE, reference signals respectively by at least two measuring beams, may include: receiving the reference signals successively by the at least two measuring beams in accordance with a fixed receiving order or non-fixed receiving order of the at least two measuring beams.

Specifically, the reference signal may include at least one of the following: a synchronization signal in a synchronization signal block; and a channel state information reference signal.

During the specific implementation, in the step S110 the UE selects, from all receiving beams, N receiving beams (for example, N=4 receiving beams) to form a set of measuring beams. In embodiments, the UE uses the N receiving beams as the measuring beams in the set of measuring beams, and at each reference signal moment, measures the RSRP value by each measuring beam in the set of measuring beams. For example, based on distribution of beams for the UE itself and a preset selection rule, the UE selects, from all receiving beams, some receiving beams to form a set of measuring beams, for example using the selected receiving beams as the measuring beams in the set of measuring beams; then, receives reference signals transmitted from a transmitting beam of a base station successively by each receiving beam (i.e., measuring beam) in the set of measuring beams, and determines the RSRP value received by each measuring beam. The reference signal transmitted by the base station includes, but is not limited to, a synchronization signal in a synchronization signal block and a channel state information reference signal.

Figure 2:
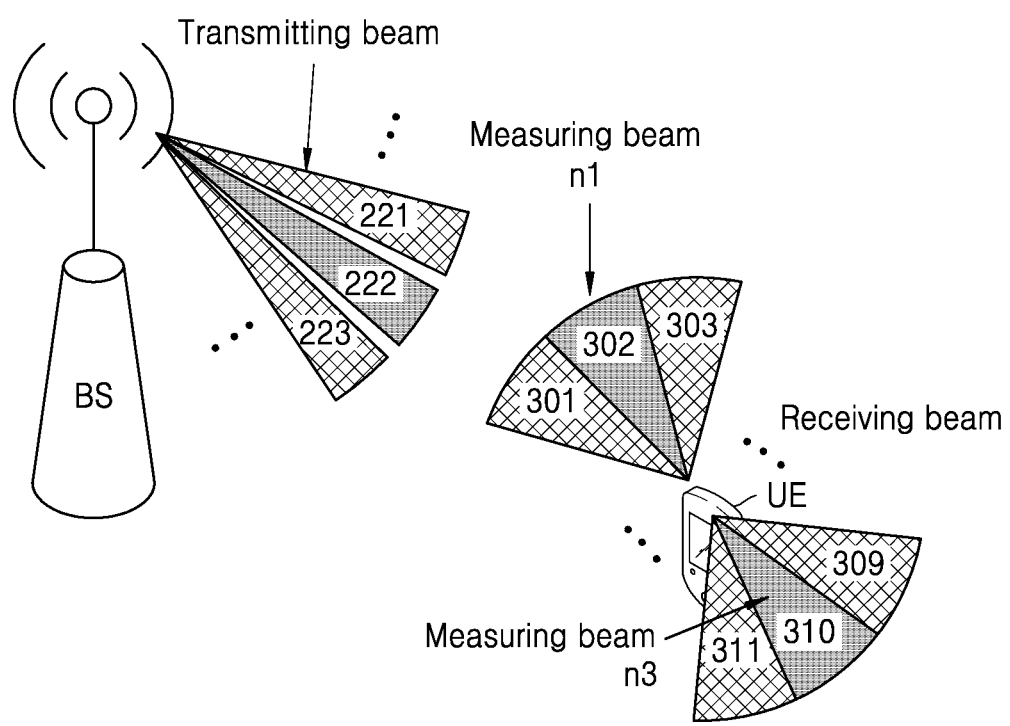
FIG. 2 is a schematic view of transmitting beams, receiving beams and measuring beams according to embodiments.

FIG. 2 is a schematic view of transmitting beams, receiving beams and measuring beams according to embodiments.

In one embodiment, as shown in FIG. 2 which is a schematic view of transmitting beams, receiving beams and measuring beams, the base station BS has transmitting beams which include transmitting beams 221, 222, and 223, and the UE has receiving beams 301, 302, 303, ... 309, 310, 311, ..., wherein the receiving beams 302 and 310 are used as beams in the set of measuring beams, i.e., measuring beam n1 and measuring beam n3. The selection of the set of measuring beams will be described below by specific examples.

For example, the UE may have a total of M narrow receiving beams. N receiving beams may be selected as beams in the set of measuring beams, i.e., measuring beams.

The N receiving beams may form a subset of the M narrow receiving beams. Both M and N may be positive integers greater than 1.

Figure 3:
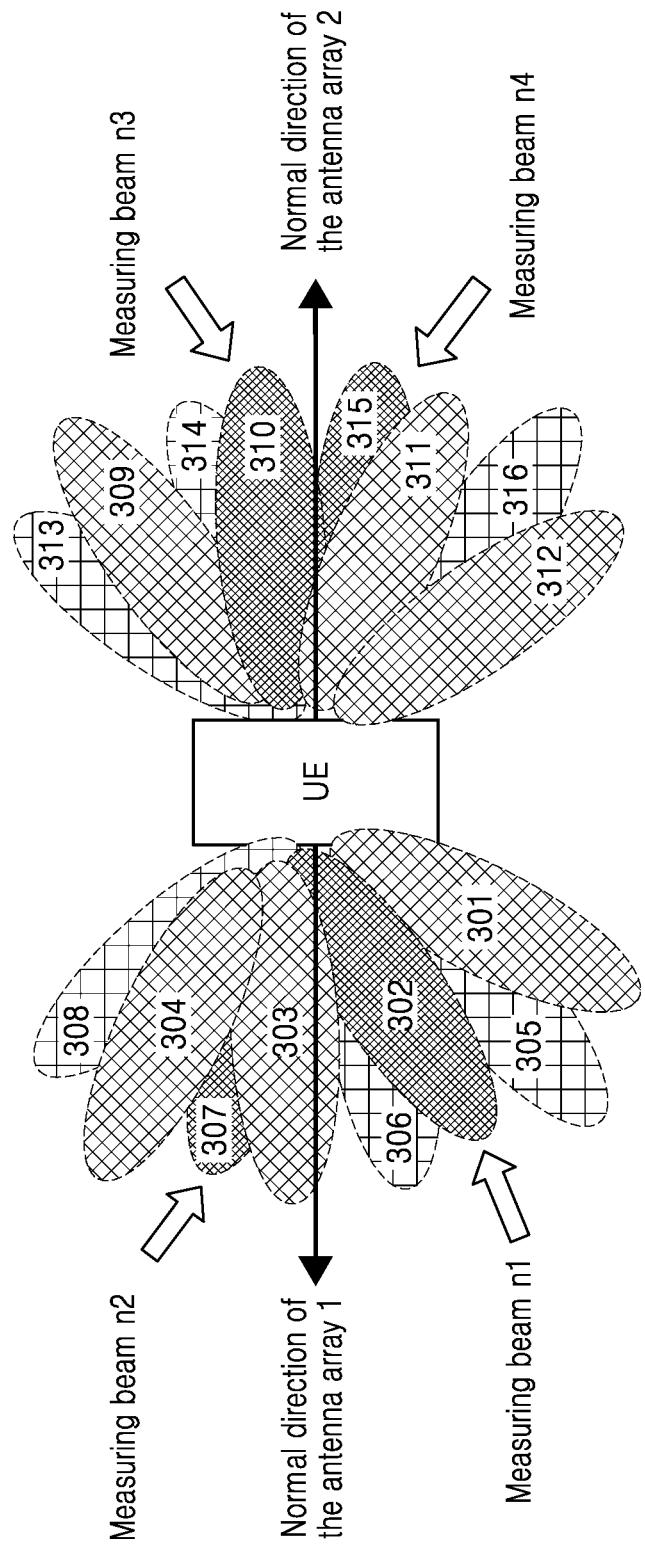
FIG. 3 is a schematic view of a preset selection rule for measuring beams according to embodiments.

FIG. 3 is a schematic view of a preset selection rule for measuring beams according to embodiments.

In another embodiment, as shown in FIG. 3 which is a schematic view of the preset selection rule for measuring beams, the UE has M (M=16) receiving beams: 301, 302, 303, 304, 305, 306, 307, 308, 309, 310, 311, 311, 313, 314, 315, 316. N=4 receiving beams 302, 307, 310, and 315 may be used as the measuring beams n1, n2, n3, n4. For example, receiving beam 302 may be used as measuring beam n1, receiving beam 307 may be used as measuring beam n2, receiving beam 310 may be used as measuring beam n3, and receiving beam 315 may be used as measuring beam n4, in accordance with the following rule: the measuring beams should be uniformly distributed in various directions of the entire spherical space as much as possible and the measuring beams should be close to a normal direction of an antenna array for the UE as much as possible. During the selection of measuring beams, by ensuring that the measuring beams are uniformly distributed, as much as possible, in various directions of the entire spherical space centered on the antenna array for the UE, the UE can better gather reference signal strength information from various directions; and, by ensuring that the measuring beams are close to the normal direction of the antenna array for the UE as much as possible, the UE can measure the reference signals with higher receiving gains, thereby obtaining more accurate reference signal strength information. As shown in FIG. 3, among the selected N=4 receiving beams, the receiving beam 302 and the receiving beam 307 are close to the normal direction of a first antenna array for the UE, and the receiving beam 310 and the receiving beam 315 are close to the normal direction of a second antenna array for the UE.

Figure 4:
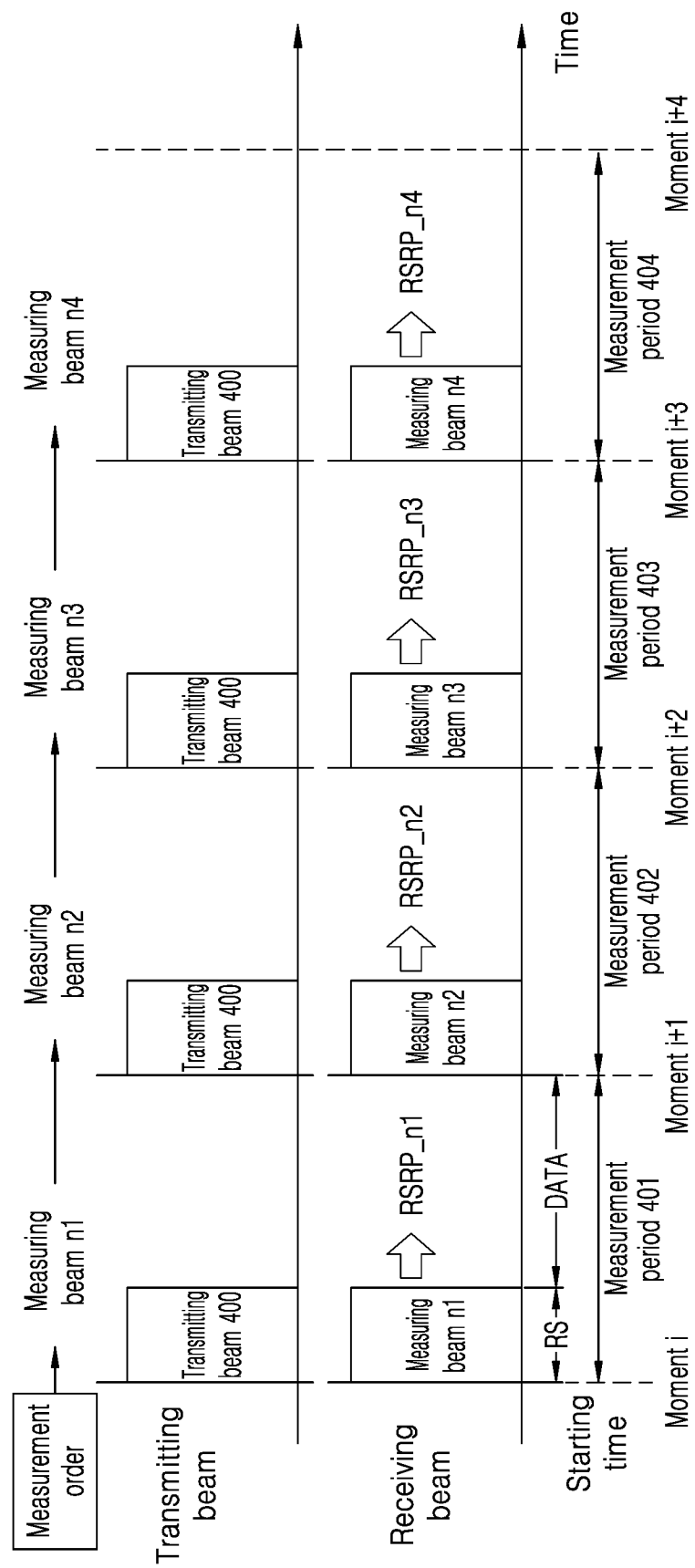
FIG. 4 is a schematic view of a sequence chart of reference signal transmission by a base station and reference signal reception by a UE, according to embodiments.

FIG. 4 is a schematic view of a sequence chart of reference signal transmission by a base station and reference signal reception by a UE, according to embodiments.

After determining the set of measuring beams, the UE measures the RSRP according to this set. As shown in FIG. 4, the base station transmits a reference signal (for example, a synchronization signal block) by a transmitting beam 400 at a reference signal transmission moment (for example, moments i, i+1, i+2, i+3, . . . ) and at a specific reference signal time-frequency resource position; and the UE receives the reference signal transmitted from the transmitting beam 400 successively by the N=4 measuring beams n1, n2, n3, n4 in this set, i.e., the receiving beams 302, 307, 310, 315, and determines the RSRP value received by each measuring beam, respectively RSRP_n1, RSRP_n2, RSRP_n3, RSRP_n4, during the measurement periods 401, 402, 403, and 404.

In another embodiment, the measurement order for the measuring beams in the set of measuring beams may be fixed. By taking the above embodiment as an example, the set of measuring beams for the UE includes receiving beams 302, 307, 310, 315, and the measurement order for the receiving beams during each measurement may be fixed, for example 302>307>310>315.

By the fixed measurement order for the receiving beams, the UE can input, in a fixed order, the RSRP information received by the N measuring beams into the subsequent data visualization and prediction network analysis steps, so that the prediction network can better learn the distribution of the measuring beams in the entire spherical space, thus to predict RSRP information on all receiving beams, for example all the M receiving beams, by the RSRP information on some receiving beams, for example the N measuring beams.

In another embodiment, the measurement order for the receiving beams in the set of measuring beams may be non-fixed. By taking still the above embodiment as an example, the set of measuring beams for the UE includes receiving beams 302, 307, 310, 315, and the measurement order for the receiving beams may be 302>307>310>315 during this measurement and 307>302>315>310 during the next measurement. By the non-fixed measurement order for the receiving beams, the UE can measure the reference signal by the measuring beams more flexibly. The implementation complexity of the UE is decreased.

2. Example Implementation of the Step S120

An example of step S120 will be specifically described below by the following embodiment.

In one possible implementation, processing the RSRP value measured by each measuring beam as a respective data table includes: for each measuring beam, determining a numerical value for each cell in the respective data table according to the RSRP value measured by the each measuring beam.

Specifically, determining a numerical value for each cell in the respective data table according to the RSRP value measured by the each measuring beam may include: in the respective data table for the each measuring beam, using the RSRP value measured by the each measuring beam as the numerical value for a first cell corresponding to a receiving direction of the each measuring beam; determining, according to the RSRP value measured by the each measuring beam, a numerical value for a second cell in the data table, the second cell corresponding to other directions except for the receiving direction of the each measuring beam. In embodiments, rows in the data table may correspond to vertical angles and columns in the data table corresponding to horizontal angles. In embodiments, rows in the data table may correspond to horizontal angles and columns in the data table may correspond to vertical angles.

Specifically, the steps of, using the RSRP value measured by the each measuring beam as the numerical value for a first cell corresponding to a direction of the each measuring beam, and determining, a numerical value for a second cell in the data table may include determining the size of the data table, determining the respective first cell in the data table according to a vertical angle and a horizontal angle in the receiving direction of the each measuring beam, and using the RSRP value measured by the each measuring beam as the numerical value for the first cell; and determining, based on a preset distribution pattern, the numerical value for the second cell in the data table according to the RSRP value measured by the each measuring beam, a difference between a vertical angle for the second cell and the vertical angle in the receiving direction of the each measuring beam, a difference between a horizontal angle for the second cell and the horizontal angle in the receiving direction of the each measuring beam, and preset beam offset.

Specifically, determining a numerical value for each cell in the respective data table according to the RSRP value measured by the each measuring beam may include determining an initial data table corresponding to the each measuring beam; and updating, according to the RSRP value measured by the each measuring beam, an initial numerical value for the first cell in the initial data table and an initial numerical value for the second cell in the initial data table. In embodiments, the first cell is a cell, corresponding to the receiving direction of the each measuring beam, in the initial data table, and the initial numerical value for the first cell is a predetermined numerical value; and the second cell is a cell, corresponding to other directions except for the receiving direction of the each measuring beam, in the initial data table, and the initial numerical value for the second cell is a numerical value determined according to the predetermined numerical value, the difference between the vertical angle for the second cell and the vertical angle for the first cell, the difference between the horizontal angle for the second cell and the horizontal angle for the first cell, and the preset beam offset.

Specifically, setting beam offset may include determining, according to the receiving beams for the UE, an average of included angles between beam center directions of each two adjacent receiving beams; and using half of the average as the beam offset.

Specifically, updating, according to the RSRP value measured by the each measuring beam, an initial numerical value for the first cell in the initial data table and an initial numerical value for the second cell in the initial data table may include increasing the initial numerical value for the first cell in the initial data table and the initial numerical value for the second cell in the initial data table by the RSRP value measured by the each measuring beam, respectively.

Specifically, the first cell may be a central point of the preset distribution pattern; and the preset distribution pattern includes Gaussian distribution.

Figure 5:
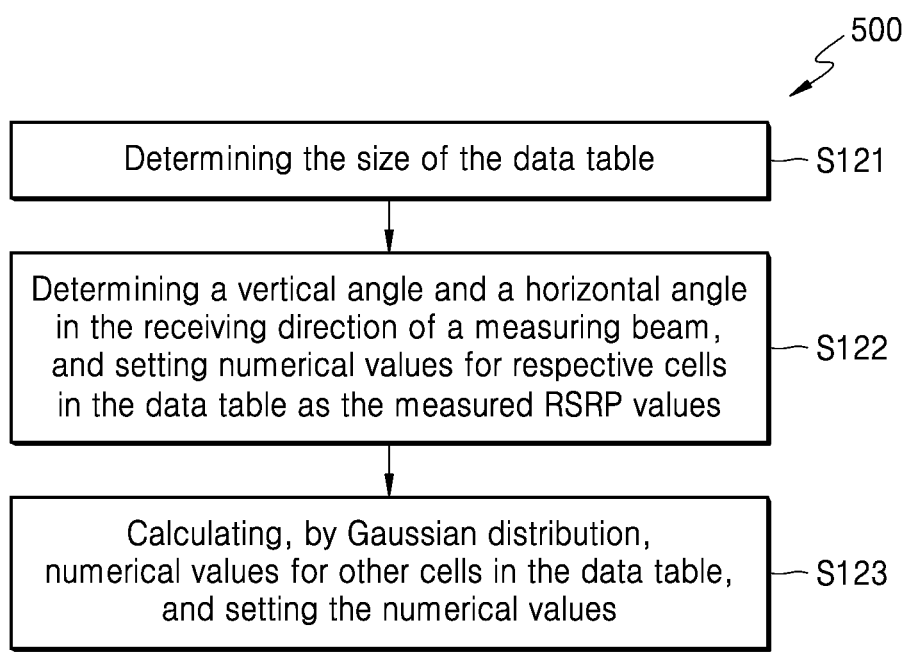
FIG. 5 is a schematic view of a data visualization process that converts RSRP values into two-dimensional data tables, according to embodiments.

FIG. 5 is a schematic view of a data visualization process 500 that converts RSRP values into two-dimensional data tables, according to embodiments.

In one embodiment, as shown in FIG. 5, a data visualization process 500 that converts RSRP values into two-dimensional data tables may include the following three operations.

At operation S121, process 500 may include determining the size of the data table.

At operation S122, process 500 may include determining a vertical angle and a horizontal angle in the receiving direction of a measuring beam, and setting numerical values for respective cells in the data table as the measured RSRP values.

At operation S123, process 500 may include calculating, by a two-dimensional Gaussian distribution formula, numerical values for other cells in the data table, and setting the numerical values.

By the operations S121, S122 and S123, in the data visualization process 500 that converts the RSRP values into two-dimensional data tables, the memory resource overhead may be saved since no data table content is to be stored in advance, and the computation is more flexible. Examples of operations S121, S122 and S123 will be specifically described below.

In the operation S121, the size of the data table may be determined by the tradeoff between the model precision and the model complexity. This operation may be performed in advance. Once the size of the data table is determined, it may not be determined again in the subsequent data visualization process. The data table may be a two-dimensional data table obtained by the data visualization of the RSRP values measured by the measuring beams. The two-dimensional data table may be a two-dimensional data table similar to an image. Numerical values for the cells in the two-dimensional data table may be determined according to the RSRP values measured by the measuring beams. Moreover, the measuring beams may be in one-to-one correspondence to the two-dimensional data tables, that is, one measuring beam corresponds to one two-dimensional data table.

Figure 6:
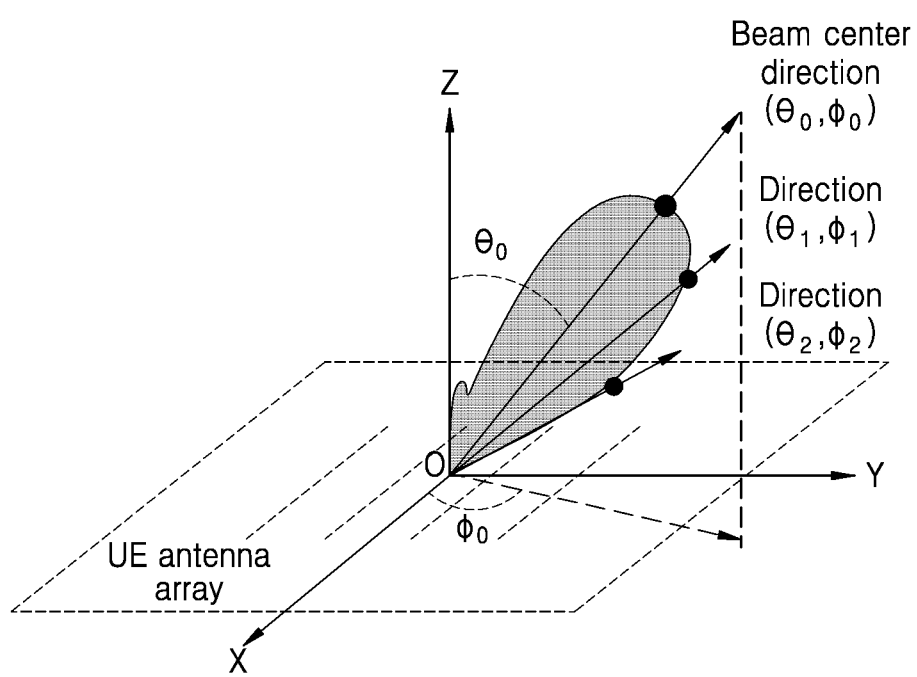
FIG. 6 is a schematic view of the beam shape and the beam direction of a certain receiving beam, according to embodiments.

FIG. 6 is a schematic view of the beam shape and the beam direction of a certain receiving beam, according to embodiments.

As shown in FIG. 6, the direction of one measuring beam may be uniquely determined by a vertical angle $\theta$ and a horizontal angle $\varphi$. The vertical angle is an included angle between the receiving direction of a measuring beam and a Z-axis, and the horizontal angle is an included angle between a projection of the receiving direction of the measuring beam in an XY plane and an X-axis. Since the direction of a measuring beam may be uniquely determined by two parameters, the receiving direction of the measuring beam may be presented by a table.

Figure 7:
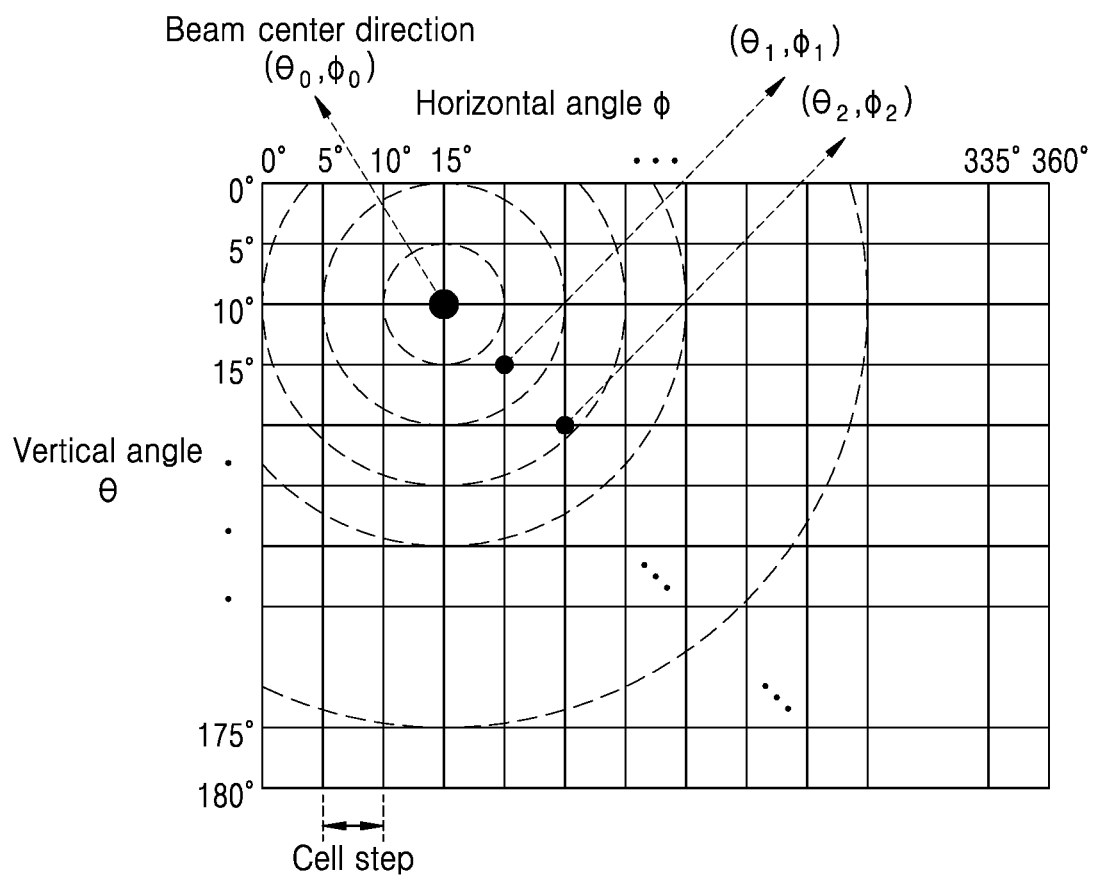
FIG. 7 is a schematic view of the position of the receiving beam direction in the two-dimensional table, according to embodiments.

FIG. 7 is a schematic view of the position of the receiving beam direction in the two-dimensional table, according to embodiments.

As shown in FIG. 7, the row number in the data table represents the vertical angle information ($\theta$) of the receiving direction of the measuring beam. For example, when the cell step is 5°, the row number 0 represents $\theta=0°$, the row number 1 represents $\theta=5°$, the row number 2 represents $\theta=10°$, . . . , and the row number 36 represents $\theta=180°$. The column number in the data table represents the horizontal angle information ($\varphi$) of the receiving direction of the measuring beam. For example, the column number 0 represents $\varphi=0°$, the column number 1 represents $\varphi=5°$, the column number 2 represents $\varphi=10°$, . . . , and the column number 72 represents $\varphi=360°$.

The size of the data table is determined by the tradeoff between the model precision and the model complexity, and may be calculated by the following method: when the cell step is 5°, the size of the data table is $(180°/5°+1)*(360°/5°+1)=37*73$.

In one embodiment, to decrease the model complexity, the cell step may be increased and the size of the data table may be decreased. However, in this way, the model precision may be decreased. For example, when the cell step is adjusted to 10°, the size of the data table is adjusted to $(180°/10°+1)*(360°/10°+1)=19*37$.

In one embodiment, after adjusting the size of the data table according to the tradeoff between the model precision and the model complexity, when the cell step is 10°, the row number in the table represents the vertical angle information ($\theta$) of the receiving direction of the measuring beam. For example, the row number 0 represents $\theta=0°$, the row number 1 represents $\theta=10°$, the row number 2 represents $\theta=20°$, . . . , and the row number 18 represents $\theta=180°$. The column number in the table represents the horizontal angle information ($\varphi$) of the receiving direction of the measuring beam. For example, the column number 0 represents $=0°$, the column number 1 represents $\varphi=10°$, the column number 2 represents $\varphi=20°$, . . . , and the column number 36 represents $\varphi=360°$.

In one embodiment, to decrease the model precision, the cell step may be decreased and the size of the data table may be increased. However, in this way, the model complexity may be increased. For example, when the cell step is adjusted to 2.5°, the size of the data table is adjusted to $(180°/2.5°+1)*(360°/2.5°+1)=73*145$.

In one embodiment, the information represented by the row number and the information represented by the column number in the data table may be exchanged. By taking still the cell step of 5° as an example, the row number in the data table represents the horizontal angle information ($\varphi$) of the receiving direction of the measuring beam. For example, the row number 0 represents $\varphi=0°$, the row number 1 represents $\varphi=5°$, the row number 2 represents $\varphi=10°$, . . . , and the row number 72 represents φ=360°. The column number in the data table represents the vertical angle information (θ) of the receiving direction of the measuring beam. For example, the column number 0 represents θ=0°, the column number 1 represents θ=5°, the column number 2 represents θ=j10°, . . . , and the column number 36 represents θ=180°.

In an embodiment, in the operation S122, firstly, the vertical angle $\theta_0$ (0-180°) and the horizontal angle $\varphi_0$ (0-360°) corresponding to the receiving direction of the current measuring beam are determined, as shown in FIG. 6; then, a corresponding cell $(Y_0, X_0)$ is determined in the data table, which may be regarded as a first cell or a vertex cell (in the embodiment, as a first cell), as shown in FIG. 7; and the numerical value of the first cell $(Y_0, X_0)$ is set as the RSRP value measured by the current measuring beam in the receiving direction.

In an embodiment, in the operation S122, the first cell in the data table may be determined by the principle of proximity, an example of which is shown in Equations 1 and 2 below:

Cell row number $Y_0=\lfloor$vertical angle $\theta_0$/cell step $D+0.5\rfloor$      Equation 1

Cell column number $X_0=\lfloor$horizontal angle $\varphi_0$/cell step $D+0.5\rfloor$      Equation 2 where, $\lfloor \ldots \rfloor$ means rounding down.

In an embodiment, in the operation S123, the numerical value for the second cell in the data table may be calculated by two-dimensional Gaussian distribution, and may be set correspondingly, but not limited to two-dimensional Gaussian distribution. The second cell corresponds to other directions except for the receiving direction of the each measuring beam. In other words, the second cell refers to other cells, except for the first cell, in the data table. An example of the calculation formula using two-dimensional Gaussian distribution is as shown in Equation 3 below:

$$\text{Value}(Y_i, X_i) = RSRP_{dB} + 10\log_{10}\left\{\exp\left(\frac{-1.0*(d\theta^2 + d\varphi^2)}{\text{corr\_dis}^2}\right)\right\} \quad \text{Equation 3}$$

where, Value$(Y_i, X_i)$ is the numerical value for a certain cell $(Y_i, X_i)$ in the data table, $RSRP_{dB}$ is the RSRP value (dB value, that is, in unit of dBm) measured by the current measuring beam in the receiving direction; dθ is the difference between the vertical angle $\theta_i$ for a certain cell and the vertical angle $\theta_0$ in the receiving direction of the measuring beam; dφ is the difference between the horizontal angle $\varphi_i$ for a certain cell and the horizontal angle $\varphi_0$ in the receiving direction of the measuring beam; and corr_dis is the preset beam offset, i.e., the correlation distance between beam directions. In embodiments, dθ and dφ may be calculated according to Equations 4 and 5 below:

$d\theta=\text{abs}(\theta_i-\theta_0)$      Equation 4

$d\varphi=\text{abs}(\varphi_i-\varphi_0)$      Equation 5

Particularly, when dφ>180°, an additional operation is needed, dφ=360°-dφ.

Figure 8:
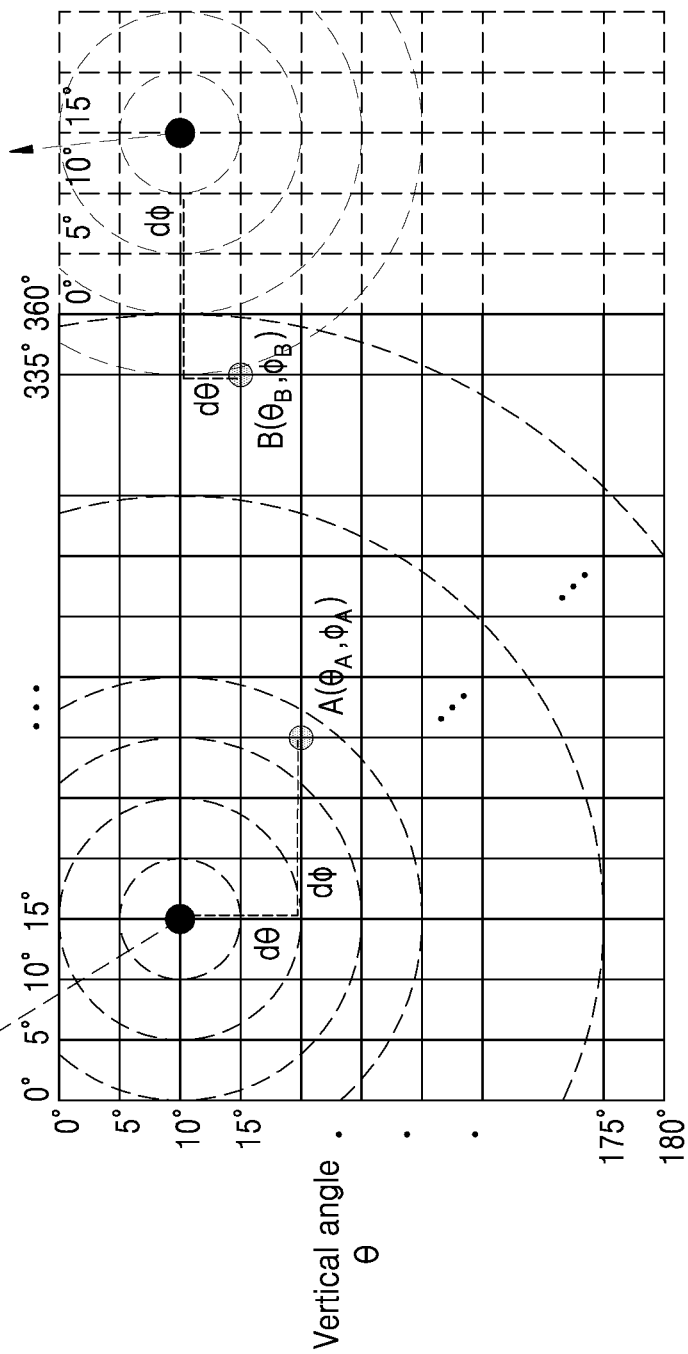
FIG. 8 is a schematic view of a process of calculating offsets of horizontal angles and vertical angles between different beam directions and the beam center direction, according to embodiments.

FIG. 8 is a schematic view of a process of calculating offsets of horizontal angles and vertical angles between different beam directions and the beam center direction, according to embodiments.

In one embodiment, as shown in FIG. 8, a schematic view of a process of calculating offsets of horizontal angles and vertical angles of different beam directions relative to the receiving direction is shown. In FIG. 8, the cell A is close to the cell O to which the receiving direction is pointed, and, dθ and dφ are calculated by dθ=abs($\theta_A-\theta_0$) and dφ=abs($\varphi_A-\varphi_0$); the cell B is far from the cell O' to which the receiving direction is pointed, and dθ and dφ are calculated by dθ=abs($\theta_B-\theta_0$) and dφ=abs($\varphi_B-\varphi_0$), where dφ>180°. Therefore, an additional operation is needed: dφ=360°-dφ. That is, dφ is the offset of the horizontal angle between the cell B and the cell O' to which the receiving direction of an imaginary table obtained by translating the original table by 360° is pointed.

Figure 9A:
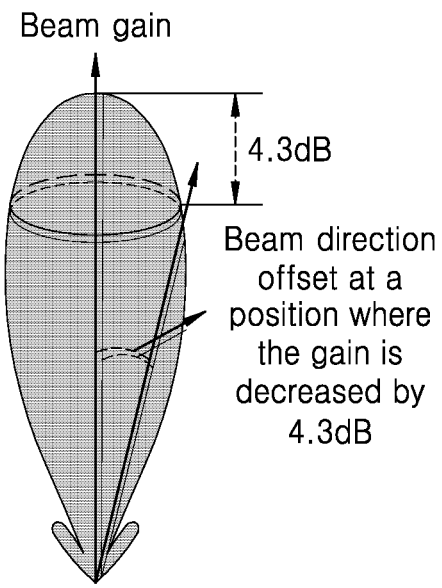
FIGS. 9A-9B are a schematic view of definition and setting of the correlation distance between beam directions, according to embodiments.
Figure 9B:
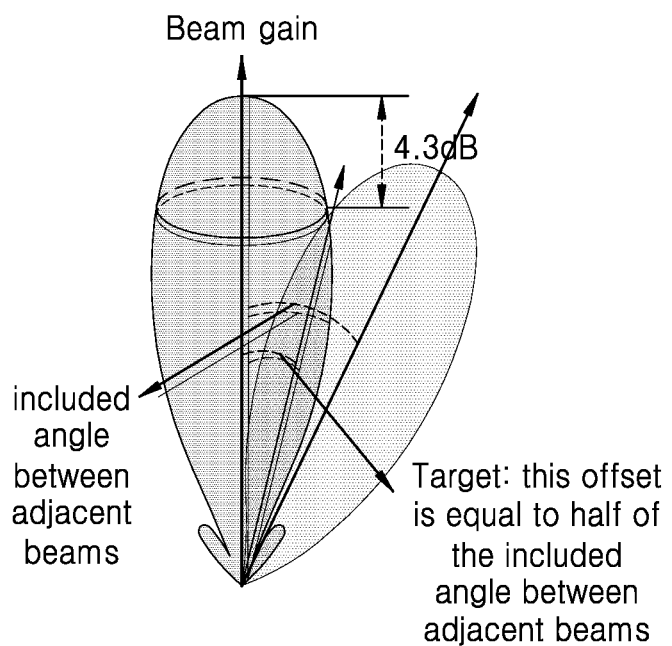

FIGS. 9A-9B are a schematic view of definition and setting of the correlation distance between beam directions, according to embodiments.

In the operation S123, as shown in FIG. 9A, the correlation distance corr_dis between beam directions may be predefined as the beam offset of a beam direction having a beam gain about 4.3 dB lower than that at the beam center, relative to the beam center direction. 4.3 dB is the RSRP reduction amount at $$\frac{d\theta^2 + d\varphi^2}{\text{corr\_dis}^2} = 1, \text{i.e.,}$$

$10 \log_{10} \exp\{-1.0\} \approx 4.3$ dB.

The beam offset is set in such a way that the beam offset is equal to half of the average of the included angles between each two adjacent receiving beams, as shown in FIG. 9B. Since the rotation of the UE leads to the offset of the receiving beam direction, the RSRP value received by the receiving beam is reduced. When the RSRP is reduced by 4.3 dB, the original receiving beam may not be the optimal beam any more, the adjacent beams may be better. In this case, it should be tried to determine whether there is a better beam. Therefore, the correlation distance corr_dis between the beam directions may be determined in the following way.

In practice, an average of an included angle between beam center directions of each two adjacent receiving beams may be determined according to the distribution of all receiving beams for the UE. The correlation distance corr_dis is set as half of the average of the included angles. For example, when the UE has M=16 receiving beams, with high coverage in the entire spherical space, the average of the included angles between beam center directions of each two adjacent receiving beams is about 50°. In this case, the correlation distance corr_dis may be set as 25°.

Figure 10:
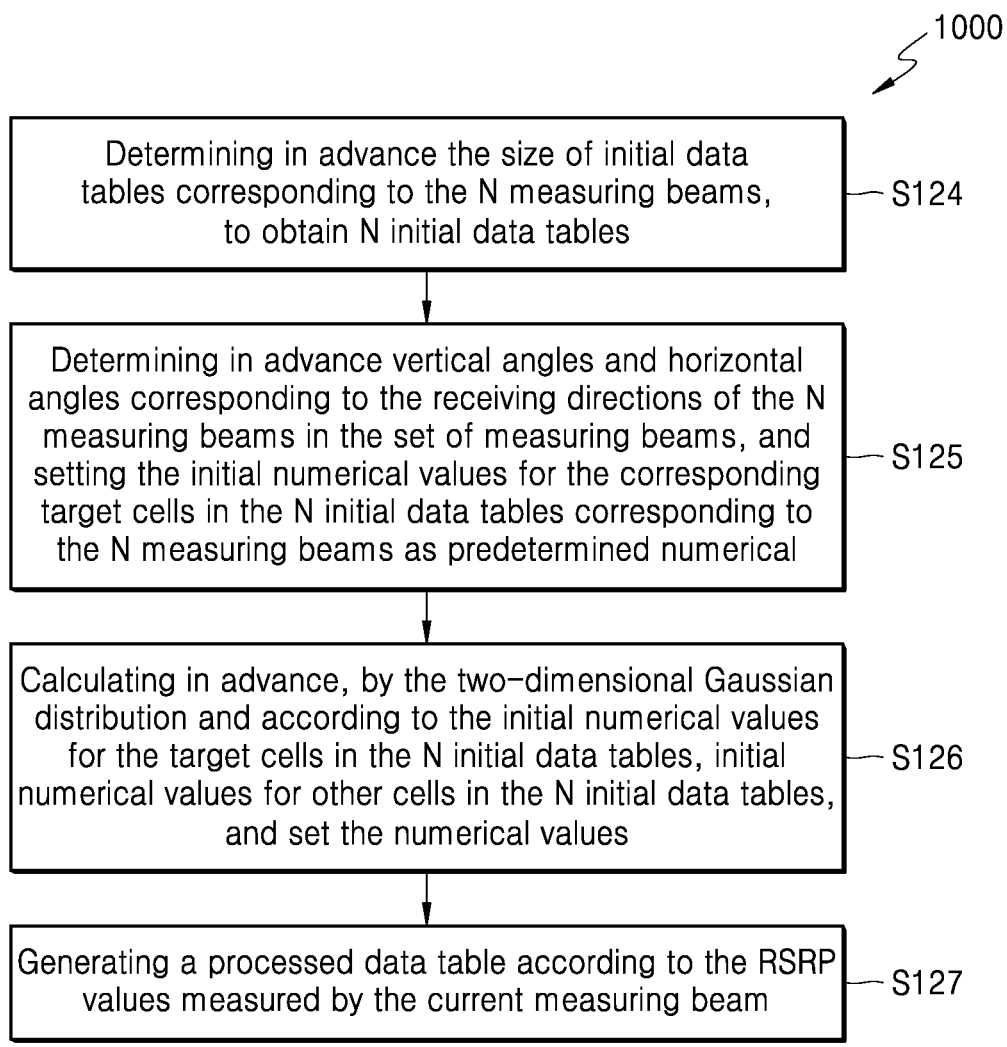
FIG. 10 is a schematic view of another data visualization process that converts RSRP values into two-dimensional data tables, according to embodiments.

FIG. 10 is a schematic view of another data visualization process 1000 that converts RSRP values into two-dimensional data tables, according to embodiments.

In an embodiment, as shown in FIG. 10, a data visualization process 1000 that converts RSRP values into two-dimensional data tables may include the following operations:

At operation S124, process 1000 may include determining in advance the size of initial data tables corresponding to the N measuring beams, to obtain N initial data tables;

At operation S125, process 1000 may include determining in advance vertical angles and horizontal angles corresponding to the receiving directions of the N measuring beams in the set of measuring beams, and setting the initial numerical values for the first cells in the N initial data tables corresponding to the N measuring beams as predetermined numerical values (for example, 0 dB), i.e., generating N initial data tables corresponding to the N measuring beams in the set of measuring beams, wherein in each of the N initial data tables, the first cell corresponds to the vertical angle and the horizontal angle that are corresponding to the receiving direction of the measuring beam in the initial data table, that is, the first cell is a cell, corresponding to the receiving direction of the measuring beam corresponding to the initial data table, in each initial data table;

At operation S126, process 1000 may include calculating in advance, by the two-dimensional Gaussian distribution and according to the initial numerical values for the first cells in the N initial data tables, initial numerical values for the second cells in the N initial data tables, and setting the numerical values, wherein the second cells are cells, except for the first cell, in the initial data tables, that is, cells corresponding to other directions, except for the receiving direction, of the measuring beam;

At operation S127, process 1000 may include generating a processed data table according to the RSRP values measured by the current measuring beam, wherein, according to the current measuring beam, an initial data table corresponding to the current measuring beam may be selected from predetermined N initial data tables, and the numerical values for all cells in the initial data table are added by the RSRP values measured by the current measuring beam to form a data table which is subject to data visualization. In one example, a new data table may be copied from the initial data table, and then the numerical values for all cells in the copied data table are added by the RSRP values measured by the current measuring beam to form a data table which is subject to data visualization.

By the operations S124, S125, S126 and S127, by the data visualization process 1000 that converts RSRP values into two-dimensional data tables, initial tables are calculated in advance and stored. The amount of computation during each graphical processing can be reduced. Examples of operations S124, S125, S126 and S127 will be specifically described below.

Specifically, in the operation S124, the size of the initial data table may be determined in the same way as that used in the operation S121 above. That is, the size of the initial data table may be determined by the tradeoff between the model precision and the model complexity. This operation may be performed in advance. Once the size of the initial data table and the size of the data table are determined in this operation, they may not be determined in the subsequent data visualization process 1000 again.

Specifically, in the operations S125 and S126, a corresponding initial data table may be generated in advance, for each measuring beam in the set of measuring beams. First, the first cell in the initial data table may be determined and a corresponding initial numerical value (for example, 0 dB) is set for the first cell; and then, the initial numerical value for the second cell in the initial data table may be calculated and set. The process of determining the initial numerical value for the first cell and the initial numerical value for the second cell may be similar to the operations S122 and S123 above, and the similar parts will not be repeated here.

In the operation S125, in the initial data table corresponding to the current measuring beam, the first cell may be determined as $(Y_0, X_0)$. The initial numerical value for the first cell $(Y_0, X_0)$ may be set as the predetermined numerical value (for example, 0 dB).

In the operation S126, same as the step S123, the initial numerical value for the second cell in the initial data table may be calculated by two-dimensional Gaussian distribution, and may be set correspondingly, but not limited to two-dimensional Gaussian distribution. When two-dimensional Gaussian distribution is used, the initial numerical value for the second cell may be determined by replacing the $RSRP_{dB}$ in the step 123 with the initial numerical value for the first cell. When the initial numerical value for the first cell is 0, the initial numerical value for the second cell by the two-dimensional Gaussian distribution is calculated according to Equation 6, below:

$$\text{Value}_{init}(Y_i, X_i) = 10\log_{10}\left\{\exp\left(\frac{-1.0*(d\theta^2 + d\varphi^2)}{\text{corr\_dis}^2}\right)\right\} \quad \text{Equation 6}$$

where, $\text{Value}_{init}(Y_i, X_i)$ is the initial numerical value for a certain cell $(Y_i, X_i)$ in the initial data table, $d\theta$ is the difference between the vertical angle $\theta$ for a certain cell and the vertical angle $\theta_0$ in the receiving direction of the measuring beam; $d\varphi$ is the difference between the horizontal angle $\varphi_i$ for a certain cell and the horizontal angle $\varphi_0$ in the receiving direction of the measuring beam; and corr_dis is the preset beam offset, i.e., the correlation distance between beam directions. The way of determining $d\theta$, $d\varphi$ and corr_dis may be similar to the way described in the operations S122 and S123 in the above flowchart and will not be repeated here.

In the operation S127, when the UE measures the RSRP by a certain measuring beam in the set of measuring beams, an initial data table corresponding to the measuring beam may be selected from N initial data tables predetermined in the operations S125 and S126, and the numerical values for all cells in the initial data table are increased by the RSRP values measured by the current measuring beam to form a data table which is subject to data visualization. In one example, a new data table may be copied from the initial data table, and then the numerical values for all cells in the copied data table are increased by the RSRP values measured by the current measuring beam to form a data table which is subject to data visualization.

When the initial numerical value for the first cell is 0, the initial numerical value for the second cell may be updated according to Equation 7 below:

$$\text{Value}(Y_i, X_i) = \text{Value}_{init}(Y_i, X_i) + \text{RSRP}_{dB} \quad \text{Equation 7}$$

where, $\text{Value}(Y_i, X_i)$ is the numerical value for a certain second cell in the data table which is subject to data visualization, $\text{Value}_{init}(Y_i, X_i)$ is the initial numerical value for a certain second cell in the initial data table, and $\text{RSRP}_{dB}$ is the RSRP value (dB value, i.e., in unit of dBm) measured by the current measuring beam.

When the initial numerical value for the first cell is not 0, the initial numerical value for the second cell may be updated according to Equation 8 below:

$$\text{Value}(Y_i, X_i) = \text{Value}_{init}(Y_i, X_i) + \text{RSRP}_{dB} - \text{Value}_{base}(Y_0, X_0) \quad \text{Equation 8}$$

where, $\text{Value}_{init}(Y_0, X_0)$ is the initial numerical value for the first cell in the initial data table.

By converting the RSRP values into two-dimensional data tables by data visualization, the two-dimensional data tables contain not only the amplitude information of the RSRP measured by the measuring beam, and also the spatial direction information of the measuring beam, so that the prediction network can better learn the spatial correlation between the measuring beams thus to accurately predict the RSRP on the measuring beams and other receiving beams at the next moment.

3. Example Implementation of the Step S130

An example of step S130 will be specifically described below by the following embodiment.

In one possible implementation, a prediction result is determined according to the data table, and signal reception is performed according to the prediction result; wherein, determining a prediction result includes at least one of the following: determining an optimal receiving beam; determining whether a currently activated receiving beam is in a mismatched state; determining whether to switch the receiving beam; determining the index of a receiving beam to switch to; determining to switch the receiving beam at a predetermined moment; and transmitting, to a base station, a set of candidates of optimal transmitting beams.

Specifically, determining a prediction result according to the data table may include: determining a prediction result by a predetermined prediction network, according to the data table.

Specifically, the predetermined prediction network may include a combined network of a convolutional neural network model and a recurrent neural network model, the recurrent neural network model including a long short-term memory network model.

Specifically, the prediction result may include at least one of the following: the RSRP value for each receiving beam for the UE, received respectively on at least one transmitting beam; the ranking result of the RSRP value for each receiving beam for the UE, received respectively on at least one transmitting beam; the RSRP value for each receiving beam for the UE; the ranking result of the RSRP value for each receiving beam for the UE; a set of candidates of optimal receiving beams; and a set of candidates of optimal transmitting beams.

Specifically, the method for training the prediction network may include: determining N sample RSRP values respectively measured by N target measuring beams, according to a predetermined number of sample RSRP values measured by the UE by measuring beams in at least one of the following states: the UE is moving, the UE is rotating, the UE is shielded and the UE is in a specific environment, where N is a positive integer greater than 1; processing, by data visualization, the N sample RSRP values into N sample data tables; and training the prediction network based on the N sample data tables to obtain a trained prediction network.

Specifically, in the step S130, the data tables obtained in the step S120 may be analyzed by a predetermined prediction network to obtain a corresponding prediction result output (i.e., a prediction result), and one or more optimal receiving beams are determined for further corresponding beam management, for example, determining whether a currently activated receiving beam is in a mismatched state, determining whether to switch the receiving beam, and when it is determined to switch the receiving beam, determining to which beam the receiving beam is switched and when to switch.

Figure 11:
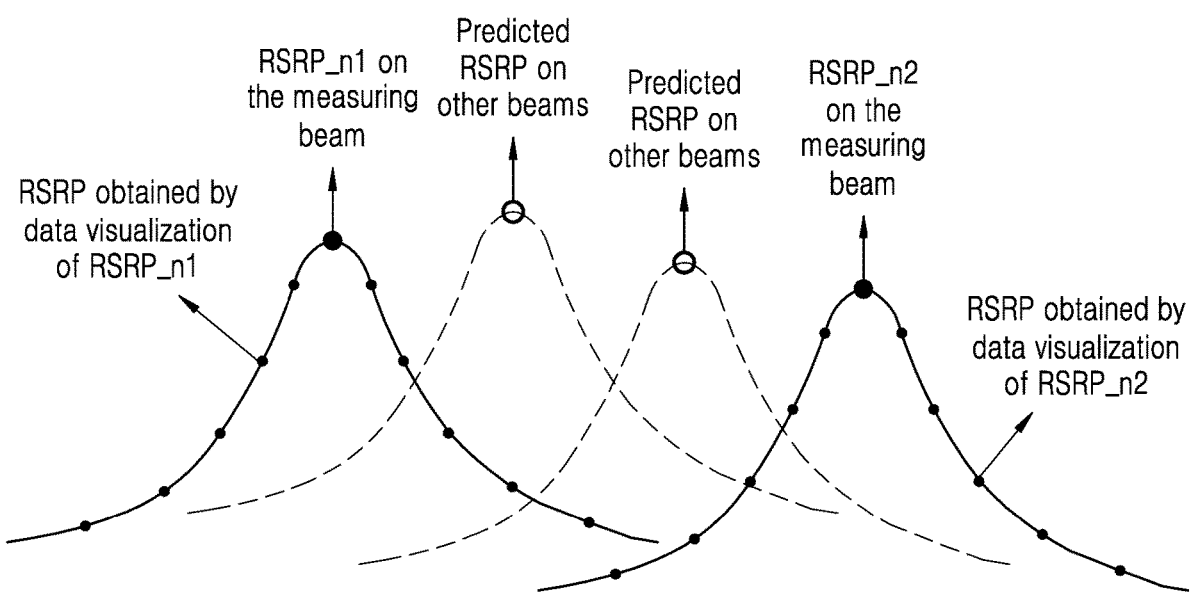
FIG. 11 is a schematic view of a principle of predicting RSRP for other beams by RSRP information on measuring beams, according to embodiments.

FIG. 11 is a schematic view of a principle of predicting RSRP for other beams by RSRP information on measuring beams, according to embodiments.

Specifically, as shown in FIG. 11, the RSRP value measured by a measuring beam (i.e., the numerical value for the first cell in the two-dimensional data table) represents the RSRP for the measuring beam in the receiving direction, and the numerical values for other cells, except for the first cell, in the data-visualized two-dimensional data table represent the RSRP values for the measuring beam in other beam directions. In this way, the data for all cells in the entire two-dimensional data table forms an envelope surface in a three-dimensional space (simplified as a two-dimensional image in FIG. 11, and actually a spatial three-dimensional image). The envelope surfaces formed by multiple two-dimensional data tables corresponding to multiple measuring beams are superposed, and greater values in the superposed parts of the envelope surfaces form a new envelope surface.

During the training of the prediction network, the RSRP information on the non-measuring beams may be input to the prediction network. By a large amount of training, the prediction network can learn the RSRP envelope surfaces at positions of other receiving beams. Thus, during the prediction, the prediction network can predict the RSRP information on other beams once the RSRP information on the measuring beam is input to the trained prediction network.

Specifically, the predetermined prediction network includes, but is not limited to, a combined convolutional neural network and recurrent neural network model, the recurrent neural network model including, but being not limited to, a long short-term memory (LSTM) network model.

Figure 12:
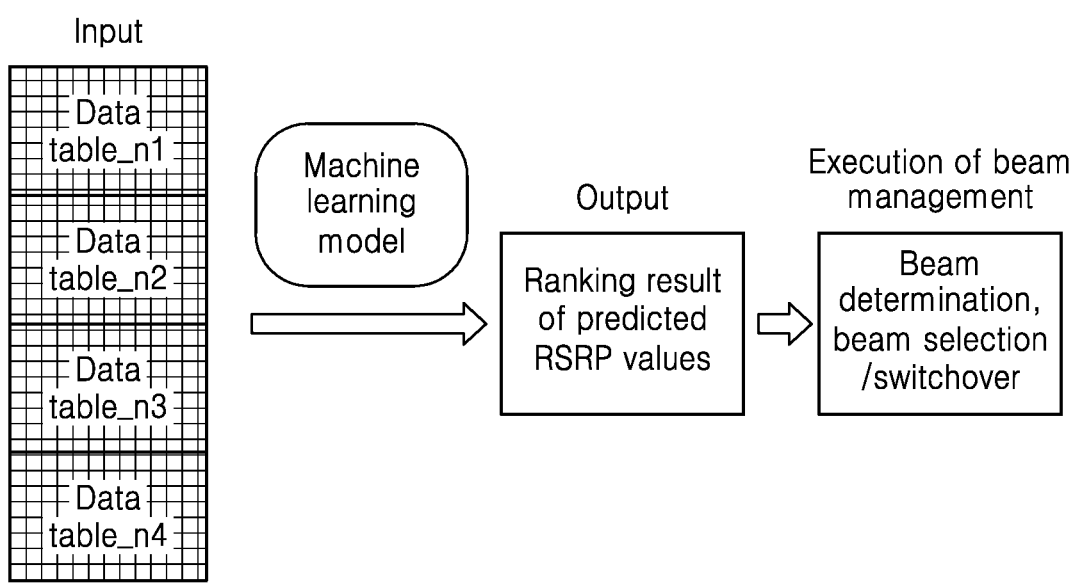
FIG. 12 is a schematic view of a process of analyzing the data table from data visualization and predicting RSRP by a prediction network, according to embodiments.

FIG. 12 is a schematic view of a process of analyzing the data table from data visualization and predicting RSRP by a prediction network, according to embodiments.

As one embodiment, as shown in FIG. 12 which is a flowchart of a process of analyzing the data table from data visualization and predicting RSRP by a prediction network, according to embodiments, the inputs are N data tables (denoted by data table_n1, data table_n2, data table_n3, data table_n4) which are subject to the data visualization in the step S120. By the analysis of the prediction network, denoted in FIG. 12 as machine learning model, the outputs may be the predicted RSRP values for the UE on the receiving beams, the ranking result of the predicted RSRP values for the UE on the receiving beams, a set of candidates of optimal receiving beams, etc. According to the analysis result output by the prediction network, the UE can perform or execute a corresponding beam management, for example, beam determination, i.e., determining whether a currently activated receiving beam is already in a mismatched state; for example, determining whether to switch the beam; for example, determining related information of row beam selection/switchover, i.e., when it is determined to switch the receiving beam, determining to which beam the receiving beam is switched and when to switch. For example, when it is predicted that the RSRP value for the currently activated receiving beam at the next moment is lower than a certain threshold, it is determined that beam mismatch may occur on the currently activated receiving beam soon; for another example, when it is predicted that the RSRP value for a certain receiving beam at the next moment is higher than the RSRP value for the currently activated receiving beam, the currently activated receiving beam is switched to that beam at the next moment.

Specifically, the predetermined prediction network includes, but is not limited to, the following artificial neural network model: a combined network of a convolutional neural network model and a recurrent neural network model, the recurrent neural network model including, but being not limited to, a long short-term memory (LSTM) network model. In other words, the predetermined prediction network used in the embodiments may be a combined artificial neural network model of a convolutional neural network and a long short-term memory network.

The convolutional neural network (CNN) model is good at extracting features in an image, and the image features correspond to the direction information of the measuring beam and the RSRP amplitude information in the embodiments. The LSTM neural network model is good at extracting the feature change trend of different time steps in a sequence (for example, text, speech, etc.). The feature change trend of different time steps corresponds to the change trend of the RSRP amplitude information on different measuring beams in the embodiments. Therefore, by converting the RSRP values into two-dimensional data tables by data visualization, the combined artificial neural network model of a convolutional neural network and a long short-term memory network can learn the spatial correlation between the measuring beams and the RSRP change information on the measuring beams, thus to accurately predict the RSRP on the measuring beams and other receiving beams at the next moment.

Figure 13:
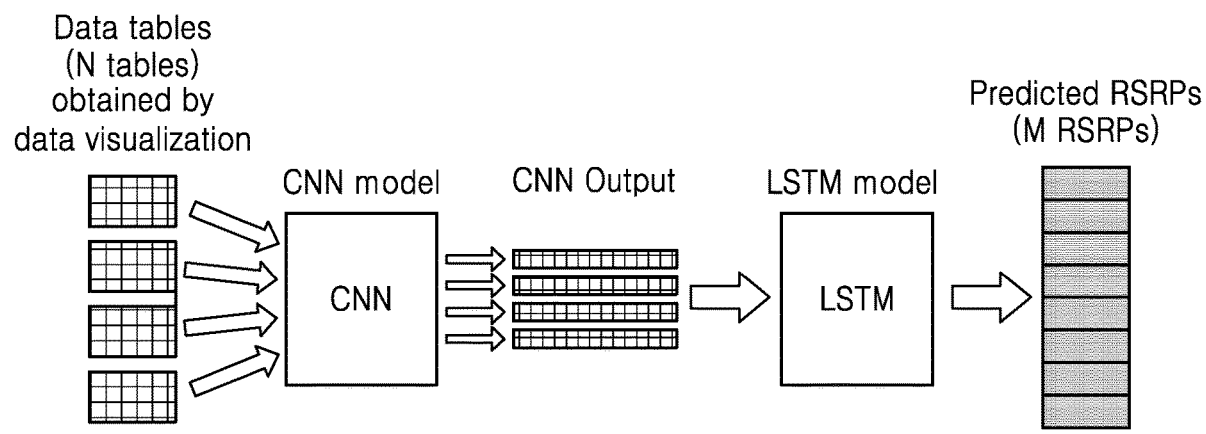
FIG. 13 is a schematic view of the prediction network, according to embodiments.

FIG. 13 is a schematic view of the prediction network, according to embodiments.

In one embodiment, as shown in FIG. 13 which is a schematic view of the prediction network according to embodiments, N data tables which are subject to data visualization are used as the inputs to the CNN model, and are input to the CNN model successively. Then, N results, output from the CNN model, together form data with N time steps, are inputs to the LSTM model. Finally, the output results are the predicted RSRP values on all the M receiving beams.

The prediction network used in this step may be obtained by pre-training. The pre-training process may be an offline training process. The offline training process may include the following steps: first, the UE traverses a variety of situations, for example the UE is in the motion state (including the UE is rotating, the UE is moving, etc.), for example the UE is shielded by obstacles, and for example the UE is in different scenarios (i.e., the UE is in a specific environment), etc., and measures and collects a large number of pieces of sample RSRP data by the measuring beams; then, selects, according to the training requirements and from a large number of pieces of sample RSRP data, N pieces of sample RSRP data corresponding to N target measuring beams, converts the N pieces of sample RSRP data into corresponding N two-dimensional data tables, as the inputs to the prediction network; then, analyzes the N two-dimensional data tables by the predetermined combined artificial neural network model of the convolutional neural network and the long short-term memory network to predict the RSRP values on all receiving beams; finally, compares the predicted RSRP values on all receiving beams with the RSRP values actually measured at this moment, and backpropagates, as a cost function, the errors to the parameters of the combined artificial neural network model of the convolutional neural network and the long short-term memory network to update the parameters of the combined artificial neural network model. The process of data selection, data visualization, analysis by the prediction network and error backpropagation is repeated continuously. The training of the combined artificial neural network model may be stopped when the cost function is less than a certain permeable error limit. That is, the training may be ended. A trained prediction network may be obtained.

By the method provided in the embodiments, by converting the measured RSRP values into corresponding two-dimensional data tables by data visualization, the amplitude information of the RSRP measured by the measuring beams can be utilized, and the spatial direction information of the measuring beams can also be utilized. In this way, the prediction network can learn the spatial power relation between the measuring beams and accurately predict the RSRP values on all receiving beams according to the RSRP values on some receiving beams, thus to quickly and accurately track excellent receiving beams at present, in order to maintain good communication link quality and ensure high-quality signal transmission.

Figure 14:
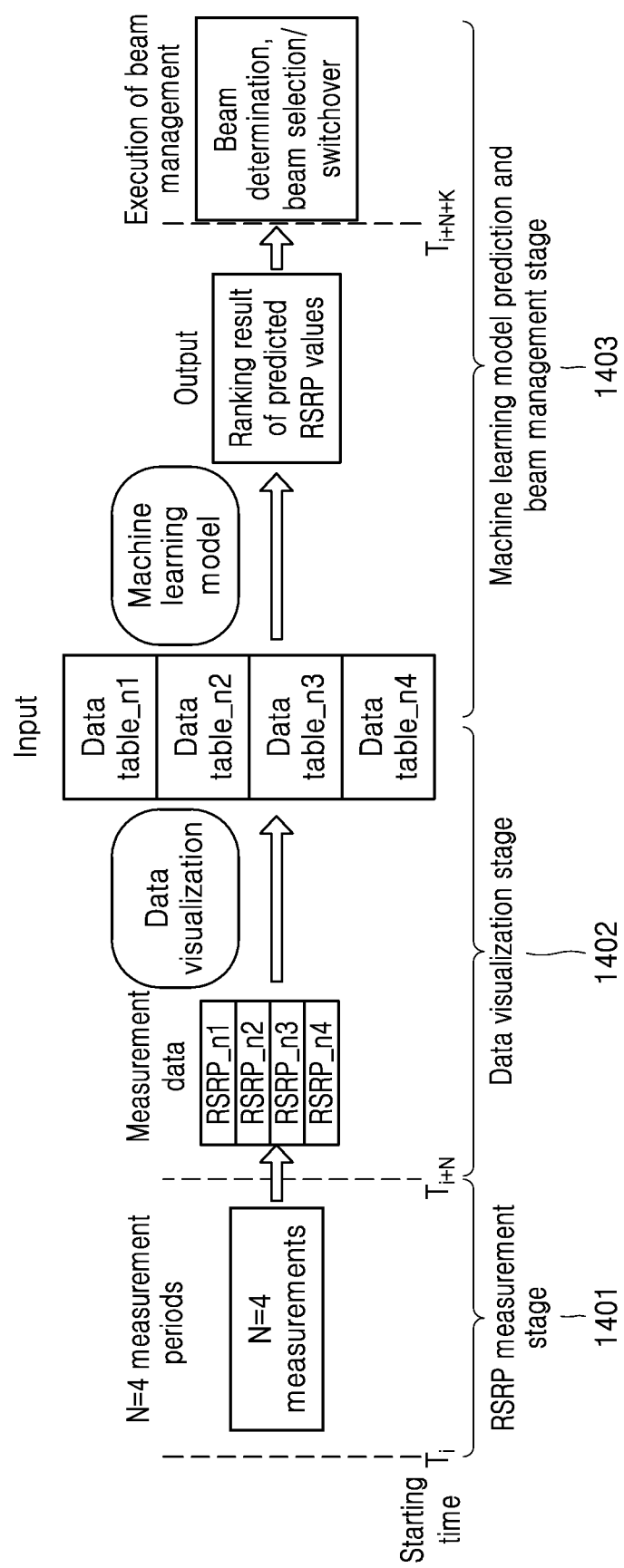
FIG. 14 is a schematic view of a beam management process, according to embodiments.

FIG. 14 is a schematic view of a beam management process, according to embodiments.

As shown in FIG. 14, the RSRP measurement stage 1401 in FIG. 14 may correspond to the operation S110, in which the UE receives, within N=4 continuous measurement periods (from time $t_i$ to $t_{i+N}$ in FIG. 4), reference signals transmitted from transmitting beams of a base station by each measuring beam in a set of measuring beams (in FIG. 14, it is supposed that there are N=4 measuring beams in the set of measuring beams), and determine the RSRP values RSRP_n1, RSRP_n2, RSRP_n3, RSRP_n4 measured by the measuring beams.

The data visualization stage 1402 in FIG. 14 may correspond to the operation S120, in which the UE converts the RSRP values measured by the measuring beams in the previous step into corresponding data tables by data visualization as shown.

The prediction network's prediction and beam management stages 1403 in FIG. 14 may correspond to the operations S130 and S140, wherein the prediction network's prediction corresponds to the operation S130 and the beam management corresponds to the operation S140. In those stages, the UE analyzes the data tables, which are generated by the data visualization in the previous step, by a predetermined prediction network, and performs beam management according to the prediction result, for example, determines the optimal receiving beam at the moment $t_{i+N+K}$, and/or determines whether the currently activated receiving beam is in a mismatched state at the moment $t_{i+N+K}$.

Example 2

Examples of operations S110-S130 of the method of signal reception in the above embodiment will be specifically described below by using, as an example, the case where the UE receives reference signals transmitted from at least two component carriers for a base station respectively by at least two measuring beams.

In this implementation, the base station may configure the UE with multiple component carriers CC according to the actual requirements. That is, the UE may be in a carrier aggregation CA scenario.

Figure 15:
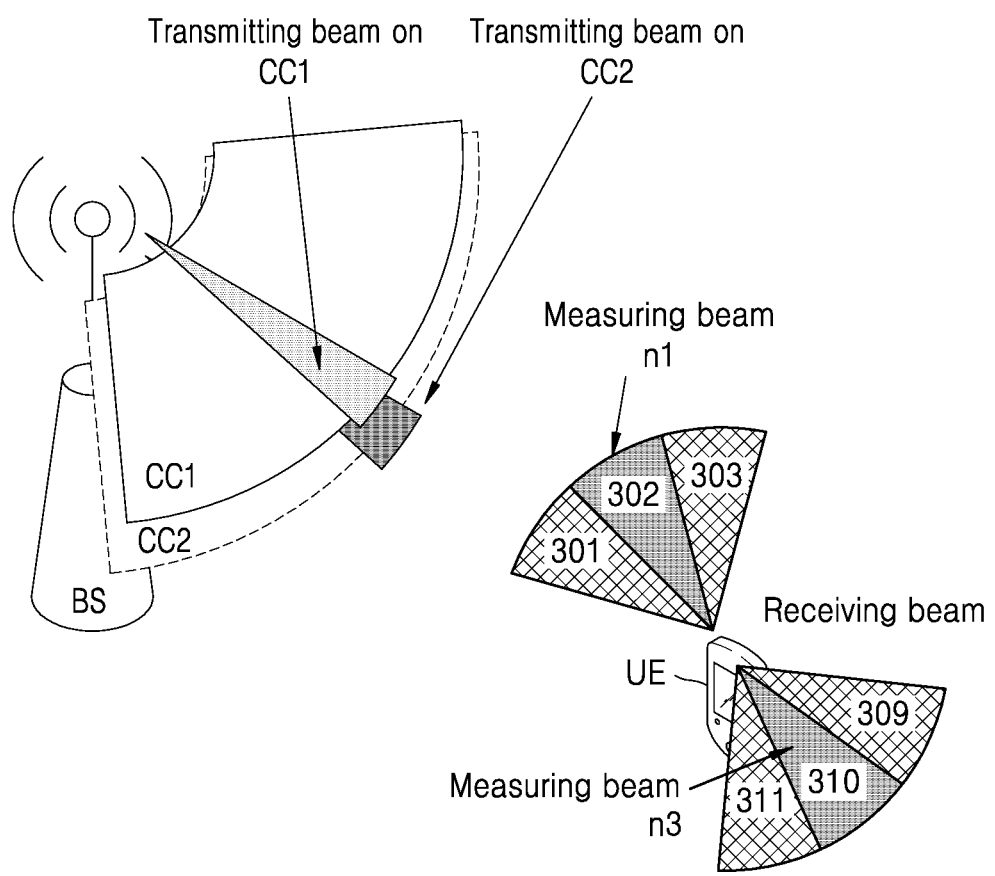
FIG. 15 is a schematic view where a user equipment is in a carrier aggregation scenario, according to embodiments.

FIG. 15 is a schematic view where a user equipment UE is in a carrier aggregation scenario, according to embodiments.

As shown in FIG. 15 which is a schematic view when the UE is in a carrier aggregation scenario, the base station configures the UE with two component carriers CC1 and CC2. In this case, the UE may receive multiple reference signals on the two component carriers.

In one possible implementation, when the UE is configured with a plurality of component carriers, a method of signal reception may include: receiving, by the UE, reference signals respectively by at least two measuring beams, and determining a RSRP value measured by each measuring beam, including, for each component carrier, receiving, by the UE, a reference signal for each component carrier respectively by at least two measuring beams corresponding to the each component carrier, and determining a RSRP value measured by each measuring beam.

In embodiments, processing the RSRP value measured by each measuring beam into a respective data table includes: for each component carrier, processing the RSRP value measured by each measuring beam corresponding to each component carrier as a respective data table, respectively.

In embodiments, performing the signal reception according to the data table includes: determining a prediction result according to the data table for each component carrier corresponding to each measuring beam, and performing the signal reception according to the prediction result.

Specifically, each component carrier may correspond to one channel in a predetermined prediction network; and determining a prediction result according to the data table for each component carrier corresponding to each measuring beam includes: receiving, by channels respectively corresponding to the component carriers in the predetermined prediction network, a data table for each component carrier corresponding to each measuring beam, and obtaining a respective prediction result according to the data table.

Specifically, the implementation when the UE is in a carrier aggregation scenario may differ from the Example 1 in following aspects, including.

(1) The selection of a set of measuring beams may be different, specifically:

As an embodiment, for component carriers, the UE selects a same set of measuring beams to receive reference signals from the component carriers. For example, the UE is configured with two component carriers CC1 and CC2. For reference signals from the both component carriers, the UE selects N=4 receiving beams 302, 307, 310, and 315 as measuring beams n1, n2, n3, n4, i.e., receiving beam 302 may be used as measuring beam n1, receiving beam 307 may be used as measuring beam n2, receiving beam 310 may be used as measuring beam n3, and receiving beam 315 may be used as measuring beam n4. In a first measurement period, the receiving beam 302 is used to complete the measurement of the reference signals from CC1 and CC2; in a second measurement period, the receiving beam 307 is used to complete the measurement of the reference signals from CC1 and CC2; and so on, until in a fourth measurement period, the receiving beam 315 is used to complete the measurement of the reference signals from CC1 and CC2.

(2) The data visualization process that converts the RSRP values into respective data tables is different, specifically:

The case where the UE is configured with two component carriers CC1 and CC2 will be described as an example. When the UE selects a same set of measuring beams to receive reference signals from the component carriers, the UE uses an enhanced data visualization process, specifically: the RSRP values RSRP_302_cc1, RSRP_302_cc2 from the component carriers, which are measured by the measuring beam n1 (that is, both CC1 and CC2 correspond to the receiving beam 302), are respectively converted into respective data tables Table_302_cc1, Table_302_cc2 by the data visualization process as described in the Example 1; then, the RSRP values RSRP_307_cc1, RSRP_307_cc2 from the component carriers, which are measured by the measuring beam n2 (that is, both CC1 and CC2 correspond to the receiving beam 307), are respectively converted into respective data tables Table_307_cc1, Table_307_cc2 by the data visualization process as described in the Example 1; and so on, until the RSRP values from the component carriers, which are measured by all the measuring beams, are respectively converted into respective data tables.

(3) During the analysis of the data tables by a predetermined prediction network, the used prediction network is different; and an enhanced prediction network is needed to perform the analysis, specifically:

In the combined artificial neural network model of a convolutional neural network and a long short-term memory network, the convolutional neural network CNN model uses multiple channels to process data tables respectively corresponding to multiple component carriers. Also, the case where the UE is configured with two component carriers CC1 and CC2 will be described as an example. The first channel processes the data table Table_302_cc1 corresponding to the component carrier CC1, and the second channel processes the data table Table_302_cc2 corresponding to the component carrier CC2. If the case where the UE is configured with three component carriers CC1, CC2 and CC3 will be described as an example, the first channel processes the data table Table_302_cc1 corresponding to the component carrier CC1, the second channel processes the data table Table_302_cc2 corresponding to the component carrier CC2, and the third channel processes the data table Table_302_cc3 corresponding to the component carrier CC3. The three channels are similar to R/G/B channels in image processing. In other words, each component carrier corresponds to one channel in the prediction network. Corresponding each component carrier to one channel in the prediction network can significantly quicken the data processing and decrease the time complexity.

(4) The output result from the prediction network and the method for determining an optimal receiving beam are different, specifically:

The output result from the prediction network is as follows: the RSRP values for the receiving beams predicted by the UE are to distinguish the receiving beams rather than the component carriers; the ranking result of the RSRP values for the receiving beams predicted by the UE is to distinguish the receiving beams rather than the component carriers; and only a set of candidates of optimal receiving beams is needed, rather than a set of candidates of optimal component carriers.

Specifically, in a multi-carrier CA scenario, firstly, the UE respectively receives, by each of multiple measuring beams, reference signals from transmitting beams on at least two component carriers, and determines a RSRP value received by each measuring beam on each component carrier; then respectively converts, by an enhanced data visualization process, each RSRP value on each component carrier into a respective data table; then analyzes, by an enhanced prediction network, data table corresponding to each component carrier, and determines an optimal receiving beam thus to perform beam management in the multi-carrier scenario.

Figure 17:
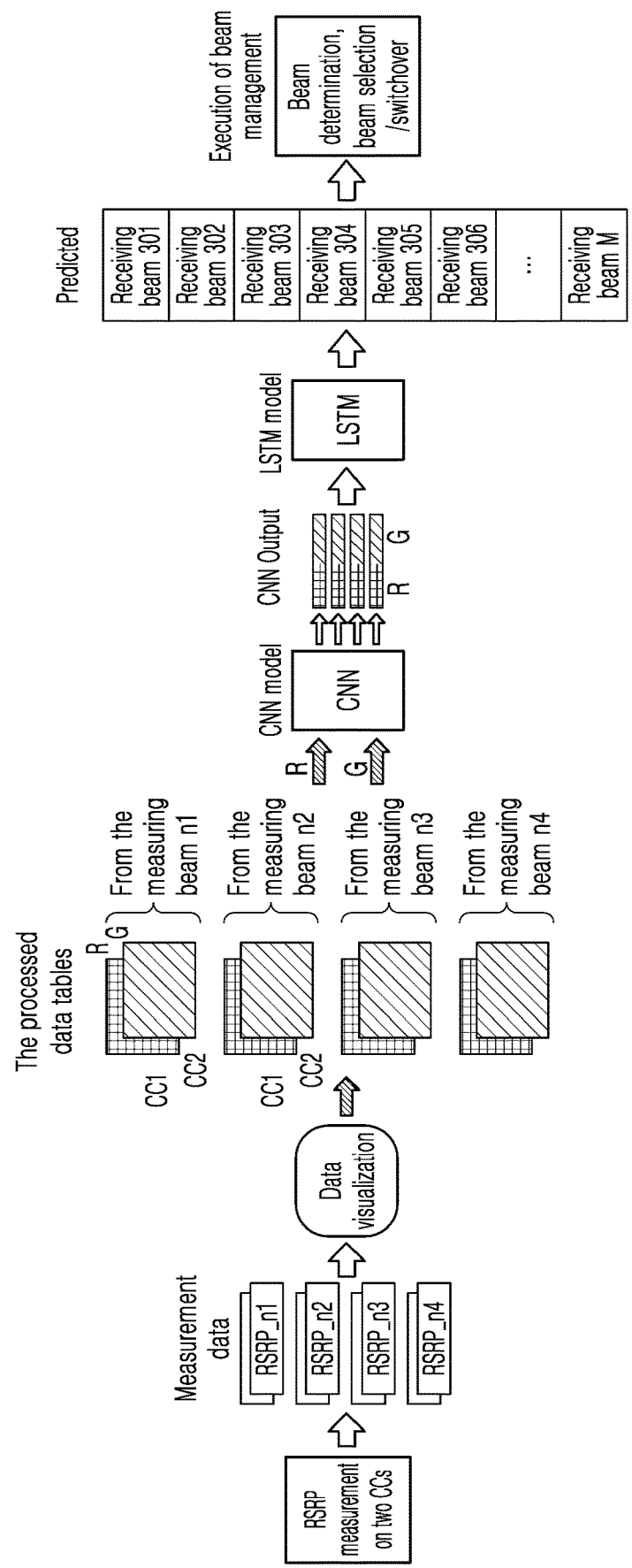
FIG. 17 is a schematic view of an overall flowchart where a user equipment is in a carrier aggregation scenario, according to embodiments.

FIG. 17 is a schematic view of an overall flowchart where a user equipment is in a carrier aggregation scenario, according to embodiments.

As shown in FIG. 17 which is a schematic view of an overall flowchart when a user equipment is in a carrier aggregation scenario, the case where the base station configures two component carriers CC1 and CC2 will be described as an example. The specific process is as follows:

Firstly, the UE may receive reference signals from two component carriers CC1 and CC2 in the base station within N=4 continuous measurement periods (receiving the reference signals from the two component carriers by a respective measuring beam in each period), and determine an RSRP value received by each measuring beam; then, convert, by an enhanced data visualization process, the RSRP value on each component carrier received by each measuring beam into a respective data table, wherein each measuring beam and each corresponding component carrier have a respective data table, that is, the receiving beam 302 (i.e., the measuring beam n1) has a data table which corresponds to the component carrier CC1, and the receiving beam 302 has a data table which corresponds to the component carrier CC2; then, input, into the two channels (similar to two of the R/G/B channels in image processing) in the CNN model and in N=4 times, the two data tables respectively corresponding to the RSRP values for the two component carriers obtained by each measurement; then, input, as four time steps, four outputs from the CNN model into the LSTM model, wherein the outputs from the LSTM model are the predicted RSRP values on each receiving beam predicted by the UE, the ranking result of the predicted RSRP values, a set of candidates of optimal receiving beams, etc.; finally, performs beam management according to the prediction results, for example, beam determination, i.e., determining whether the currently activated receiving beam is in a mismatched state, for another example, determining whether to switch the receiving beam, and for still another example, determining related information of beam selection/switchover, i.e., when it is determined to switch the receiving beam, determining to which beam the receiving beam is switched and when to switch.

By the method of the embodiments, the RSRP information measured on the multiple carriers may be converted into multiple data tables by an enhanced data visualization process, and then the data tables corresponding to the multiple component carriers are processed by multiple channels in the prediction network CNN model. During the prediction, the prediction network can take the measurement result of each receiving beam on each component carrier into full consideration. Thus, the optimal receiving beam finally determined may be obtained based on full consideration of the optimal result on each component carrier. In this way, the tracked receiving beams, which work well at present, can maintain good communication link quality on each component carrier, to ensure that high-quality system transmission can be performed on each component carrier. Furthermore, corresponding each component carrier to one channel in the prediction network can significantly quicken the data processing and decrease the time complexity.

Example 3

The operations S110-S130 of the signal receiving method in the above embodiment will be specifically described below by using, as an example, the case where the UE receives reference signals transmitted from at least two transmitting beams of a base station respectively by at least two measuring beams.

In one possible implementation, the UE receives a plurality of reference signals transmitted respectively by a plurality of transmitting beams; receives, by the UE, reference signals respectively by at least two measuring beams, and determines a RSRP value measured by each measuring beam. This may include for each transmitting beam, receiving, by the UE, a reference signal transmitted from each transmitting beam by at least two measuring beams corresponding to each transmitting beam, and determining a RSRP value measured by each measuring beam In embodiments, processing the RSRP value measured by each measuring beam into a respective data table includes, for each transmitting beam, processing the RSRP value measured by each measuring beam corresponding to each transmitting beam as a respective data table, respectively;

In embodiments, performing the signal reception according to the data table includes:

In embodiments, the UE may determine a prediction result according to the data table for each transmitting beam corresponding to each measuring beam, and perform the signal reception according to the prediction result.

Specifically, each transmitting beam may correspond to one channel in a predetermined prediction network; and determining a prediction result according to the data table for each transmitting beam corresponding to each measuring beam may include receiving, by channels respectively corresponding to the transmitting beams in the predetermined prediction network, a data table for each transmitting beam corresponding to each measuring beam, and obtaining a prediction result for each transmitting beam according to the data table for each transmitting beam.

Figure 16:
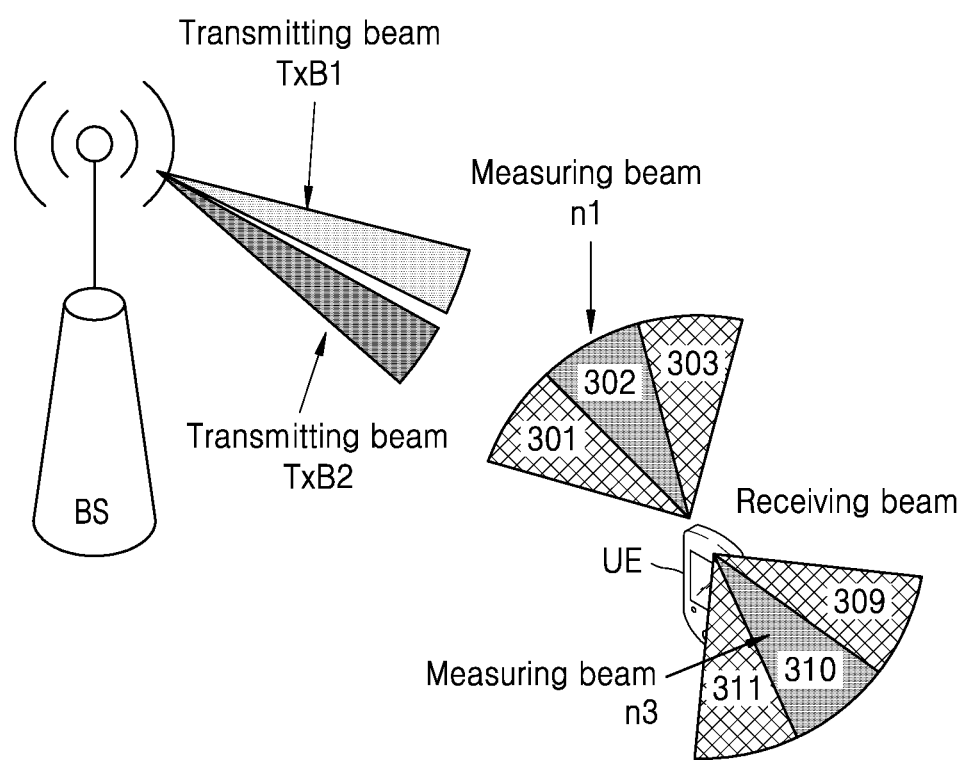
FIG. 16 is another schematic view where a user equipment is in a multi-transmitting-beam configuration, according to embodiments.

FIG. 16 is another schematic view where a user equipment is in a multi-transmitting-beam configuration, according to embodiments.

In this implementation, the base station configures, as needed, multiple transmitting beams to transmit multiple reference signals. As shown in FIG. 16 which is a schematic view when a user equipment is in a scenario where multiple transmitting beams are configured, the base station BS configures the UE with two transmitting beams TxB1 and TxB2. In this case, the user equipment needs to receive reference signals on the two transmitting beams.

Specifically, the implementation of the user equipment that receives reference signals on multiple transmitting beams differs from the Example 1 in following aspects.

(1) The selection of a set of measuring beams is different, specifically:

In one example, for transmitting beams, the UE may select a same set of measuring beams to receive reference signals from the transmitting beams. For example, the base station configures two transmitting beams TxB1 and TxB2. For reference signals from the both transmitting beams, the UE selects N=4 receiving beams 302, 307, 310, and 315 as measuring beams n1, n2, n3, n4, i.e., receiving beam 302 may be used for measuring beam n1, receiving beam 307 may be used for measuring beam n2, receiving beam 310 may be used for measuring beam n3, and receiving beam 315 may be used for measuring beam n4. In a first measurement period, the receiving beam 302 is used to complete the measurement of the reference signals from TxB1 and TxB2; in a second measurement period, the receiving beam 307 is used to complete the measurement of the reference signals from TxB1 and TxB2; and so on, until in a fourth measurement period, the receiving beam 315 is used to complete the measurement of the reference signals from TxB1 and TxB2.

In another example, for transmitting beams, the UE may select a different set of measuring beams to receive reference signals from the transmitting beams. For example, the base station BS configures two transmitting beams TxB1 and TxB2. For a reference signal from the transmitting beam TxB1, the UE selects N=4 receiving beams 302, 307, 310, and 314 as measuring beams n1, n2, n3, n4, i.e., receiving beam 302 may be used for measuring beam n1, receiving beam 307 may be used for measuring beam n2, receiving beam 310 may be used for measuring beam n3, and receiving beam 315 may be used for measuring beam n4; and for a reference signal from the transmitting beam TxB2, the UE selects N=4 receiving beams 303, 306, 311, and 314 as measuring beams n1, n2, n3, n4, i.e., receiving beam 303 may be used for measuring beam n1, receiving beam 306 may be used for measuring beam n2, receiving beam 314 may be used for measuring beam n3, and receiving beam 314 may be used for measuring beam n4. In a first measurement period, the receiving beam 302 (i.e., the measuring beam n1) is used to complete the measurement of the reference signal from TxB1; in a second measurement period, the receiving beam 307 (i.e., the measuring beam n2) is used to complete the measurement of the reference signal TxB1; and so on, until in a fourth measurement period, the receiving beam 315 (i.e., the measuring beam n4) is used to complete the measurement of the reference signal from TxB1. Next, in a fifth measurement period, the receiving beam 303 (i.e., the measuring beam n1) is used to complete the measurement of the reference signal from TxB2; in a sixth measurement period, the receiving beam 306 (i.e., the measuring beam n2) is used to complete the measurement of the reference signal TxB2; and so on, until in an eighth measurement period, the receiving beam 314 (i.e., the measuring beam n4) is used to complete the measurement of the reference signal from TxB2.

(2) The data visualization process that converts the RSRP values into respective data tables is different, specifically:

In one example, when the UE selects the same set of measuring beams to receive the reference signals from the transmitting beams, the UE uses an enhanced data visualization process, specifically:

Also, the case where the base station configures two transmitting beams TxB1 and TxB2 will be described as an example. Firstly, the RSRP values RSRP_302_TxB1, RSRP_302_TxB2 from the transmitting beams, which are measured by the measuring beam n1 (that is, both TxB1 and TxB2 correspond to the receiving beam 302), are respectively converted into respective data tables Table_302_TxB1, Table_302_TxB2 by the repeated data visualization process; then, the RSRP values RSRP_307_TxB1, RSRP_307_TxB2 from the transmitting beams, which are measured by the measuring beam n2 (that is, both TxB1 and TxB2 correspond to the receiving beam 307), are respectively converted into respective data tables Table_307_TxB1, Table_307_TxB2 by the repeated data visualization process; and so on, until the RSRP values from the transmitting beams, which are measured by all the measuring beams, are respectively converted into respective data tables.

In another example, when the UE selects a different set of measuring beams to receive the reference signals from the transmitting beams, the UE uses an enhanced data visualization process, specifically:

Also, the case where the base station configures two transmitting beams TxB1 and TxB2 will be described as an example. Firstly, the RSRP value RSRP_302_TxB1 from the receiving beam TxB1, which is measured by the measuring beam n1 (TxB1 corresponds to the receiving beam 302), and the RSRP value RSRP_303_TxB2 from the transmitting beam TxB2, which is measured by the measuring beam n1 (TxB2 corresponds to the receiving beam 303), are respectively converted into respective data tables Table_302_TxB1, Table_303_TxB2 by the data visualization process; then, the RSRP value RSRP_307_TxB1 from the receiving beam TxB1, which is measured by the measuring beam n2 (TxB1 corresponds to the receiving beam 307), and the RSRP value RSRP_306_TxB2 from the transmitting beam TxB2, which is measured by the measuring beam n1 (TxB2 corresponds to the receiving beam 306), are respectively converted into respective data tables Table_307_TxB1, Table_306_TxB2 by the data visualization process; and so on, until the RSRP values from the transmitting beams, which are measured by all the measuring beams, are respectively converted into respective data tables.

(3) During the analysis of the data tables by a predetermined prediction network, the used prediction network is different; and an enhanced prediction network is needed to perform the analysis, specifically:

In the combined artificial neural network model of a convolutional neural network and a long short-term memory network, the CNN model uses multiple channels to process data tables corresponding to multiple transmitting beams. Also, the case where the base station configures two transmitting beams TxB1 and TxB2 will be described as an example. The first channel processes the data table Table_302_TxB1 corresponding to the transmitting beam TxB1, and the second channel processes the data table Table_302_TxB2 corresponding to the transmitting beam TxB2. If the case where the base station configures three transmitting beams TxB1, TxB2 and TxB3 will be described as an example, the first channel processes the data table Table_302_TxB1 corresponding to the transmitting beam TxB1, the second channel processes the data table Table_302_TxB2 corresponding to the transmitting beam TxB2, and the third channel processes the data table Table_302_TxB3 corresponding to the transmitting beam TxB3. The three channels are similar to R/G/B channels in image processing. In other words, each transmitting beam corresponds to one channel in the prediction network. Corresponding each transmitting beam to one channel in the prediction network can significantly quicken the data processing and decrease the time complexity.

(4) The output result from the prediction network and the method for determining an optimal receiving beam are different, specifically:

The output result from the prediction network is as follows: the RSRP values for the receiving beams predicted by the UE are to distinguish the receiving beams and the configured transmitting beams; the ranking result of the RSRP values for the receiving beams predicted by the UE is to distinguish the receiving beams and the configured transmitting beams; and both a set of candidates of optimal receiving beams and a set of candidates of optimal transmitting beams are needed.

Specifically, when the base station configures multiple transmitting beams to transmit reference signals, firstly, the UE respectively receives, by each of multiple receiving beams, reference signals from the transmitting beams, and determines a RSRP value received by each receiving beam on each transmitting beam; then respectively converts, by an enhanced data visualization process, each RSRP value on each transmitting beam into a respective data table; then, analyzes the data table corresponding to each transmitting beam by an enhanced prediction network, and determines an optimal receiving beam thus to perform beam management in the multi-transmitting-beam configuration.

Figure 18:
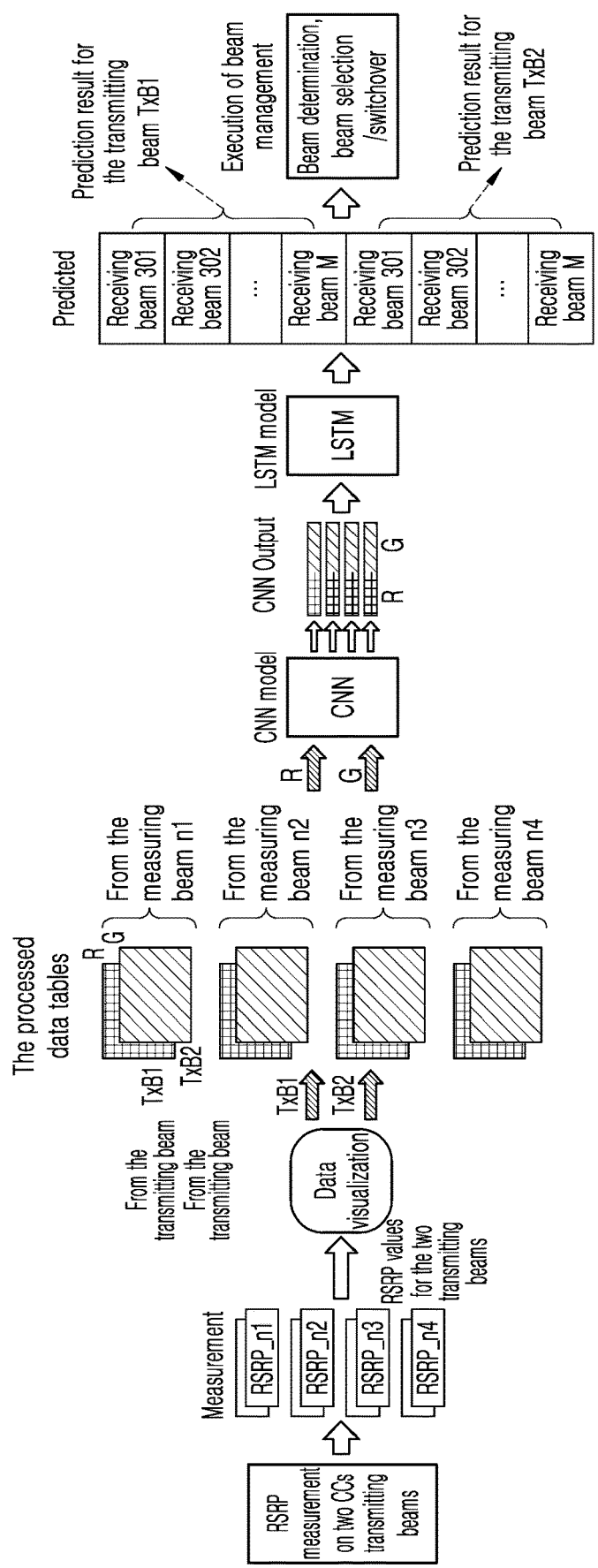
FIG. 18 is a schematic view of an overall flowchart where a user equipment is in a multi-transmitting-beam configuration, according to embodiments.

FIG. 18 is a schematic view of an overall flowchart where a user equipment is in a multi-transmitting-beam configuration, according to embodiments.

As shown in FIG. 18 which is a schematic view of an overall flowchart when a user equipment is in a multi-transmitting-beam configuration, the case where the base station configures two transmitting beams TxB1 and TxB2 will be described as an example.

When the UE selects the same set of measuring beams to receive reference signals from the transmitting beams, the process may be as follows: firstly, the UE may receive reference signals from two transmitting beams in the base station within N=4 continuous measurement periods (receives the reference signals from the two transmitting beams by a respective measuring beam in each period), and determines an RSRP value received by each measuring beam; then, converts, by an enhanced data visualization process, the RSRP value on each transmitting beam received by each measuring beam into a respective data table, wherein each measuring beam and each corresponding transmitting beam have a respective data table, that is, the receiving beam (i.e., the measuring beam n1) has a data table when it corresponds to the transmitting beam TxB1, and the receiving beam has a data table when it corresponds to the transmitting beam TxB2; then, inputs, into the two channels (similar to two of the R/G/B channels in image processing) in the CNN model and in N=4 times, the two data tables respectively corresponding to the RSRP values for the two transmitting beams obtained by each measurement; then, inputs, as four time steps, four outputs from the CNN model into the LSTM model, wherein the outputs from the LSTM model are the predicted RSRP values on the two transmitting beams predicted by the UE, the ranking result of the predicted RSRP values, a set of candidates of optimal receiving beams, a set of candidates of optimal transmitting beams, etc.; finally, performs beam management according to the prediction results, for example, beam determination, i.e., determining whether the currently activated receiving beam is in a mismatched state, for another example, determining whether to switch the receiving beam, and for still another example, determining related information of beam selection/switchover, i.e., when it is determined to switch the receiving beam, determining to which beam the receiving beam is switched and when to switch; and for yet another example, sending information about candidates of optimal transmitting beams to the base station.

When the UE selects a different set of measuring beams to receive reference signals from the transmitting beams, the process is as follows:

firstly, the UE may receive reference signals from two transmitting beams in the base station within 4*2 continuous measurement periods, wherein the UE receives the reference signal from the first transmitting beam by each measuring beam corresponding to the first transmitting beam in each of the first four periods and determines an RSRP value on the first transmitting beam received by each measuring beam, and, receives the reference signal from the second transmitting beam by each measuring beam corresponding to the second transmitting beam in each of the last four periods and determines an RSRP value on the second transmitting beam received by each measuring beam; then, converts, by an enhanced data visualization process, the RSRP value on each transmitting beam received by each measuring beam into a respective data table, wherein each transmitting beam and each corresponding measuring beam have a respective data table, that is, the receiving beam 302 has a data table corresponding to the transmitting beam TxB1, and the receiving beam 302 has a data table corresponding to the transmitting beam TxB2; then, inputs, into the two channels (similar to two of the R/G/B channels in image processing) in the CNN model and in N=4 times, the two data tables respectively corresponding to the RSRP values for the two transmitting beams obtained by the measurements within the first four periods and the last four periods; then, inputs, as four time steps, four outputs from the CNN model into the LSTM model, wherein the outputs from the LSTM model are the predicted RSRP values on the two transmitting beams predicted by each receiving beam for the UE, the ranking result of the predicted RSRP values, a set of candidates of optimal receiving beams, a set of candidates of optimal transmitting beams, etc.; finally, performs beam management according to the prediction results, for example, beam determination, i.e., determining whether the currently activated receiving beam is in a mismatched state, for another example, determining whether to switch the receiving beam, and for still another example, determining related information of beam selection/switchover, i.e., when it is determined to switch the receiving beam, determining to which beam the receiving beam is switched and when to switch; and for yet another example, sending information about candidates of optimal transmitting beams to the base station.

By the method of the embodiments, the RSRP information measured on the multiple transmitting beams is converted into multiple data tables by an enhanced data visualization process, and then the data tables corresponding to the multiple component carriers are processed by multiple channels in the prediction network CNN model. During the prediction, the prediction network can take the measurement result of each receiving beam on each transmitting beam into full consideration. Thus, optimal transmitting beams are determined while determining optimal receiving beams. In this way, information about optimal transmitting beams is sent to the base station while tracking receiving beams which work well at present, to ensure an excellent beam pair (a pair of transmitting beam and receiving beam). Further, corresponding each transmitting beam to one channel in the prediction network can significantly quicken the data processing and decrease the time complexity.

Figure 19:
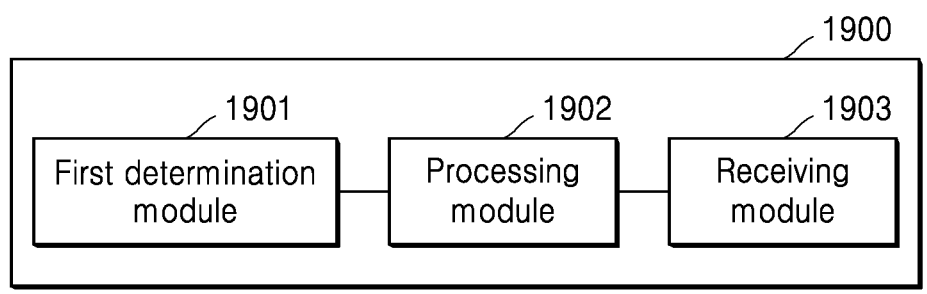
FIG. 19 is a schematic view of the basic structure of the user equipment according to embodiments.

FIG. 19 is a structure diagram of a user equipment according to another embodiment. As shown in FIG. 19, the device 1900 may include a first determination module 1901, a processing module 1902 and a receiving module 1903.

In embodiments, the first determination module 1901 is configured to receive reference signal respectively by at least two measuring beams, and determine a RSRP value measured by each measuring beam.

In embodiments, the processing module 1902 is configured to process the RSRP value measured by each measuring beam as a respective data table.

In embodiments, the receiving module 1903 is configured to perform signal reception according to the data table.

In one possible implementation, at least two measuring beams are determined from receiving beams for the UE based on distribution of beams for the UE and a preset selection rule; or at least two measuring beams are determined from receiving beams for the UE according to received configuration information.

In one possible implementation, when determining at least two measuring beams from receiving beams for the UE based on distribution of beams for the UE and a preset selection rule, the first determination module 1901 is configured to execute at least one of the following: determining, from receiving beams for the UE, at least two measuring beams that are uniformly distributed in various directions of the entire spherical space centered on antenna array for the UE; and determining, from receiving beams for the UE, at least two measuring beams that are close to a normal direction of the antenna array for the UE.

In one possible implementation, when receiving reference signals transmitted from transmitting beams respectively by at least two measuring beams, the first determination module 1901 is specifically configured to: receive the reference signals successively by the at least two measuring beams in accordance with a fixed receiving order or non-fixed receiving order of the at least two measuring beams.

In one possible implementation, the reference signal includes at least one of the following: a synchronization signal in a synchronization signal block; and a channel state information reference signal.

In one possible implementation, the processing module 1902 is specifically configured to: for each measuring beam, determine a numerical value for each cell in the respective data table according to the RSRP value measured by the each measuring beam.

In one possible implementation, when determining a numerical value for each cell in the respective data table according to the RSRP value measured by the each measuring beam, the processing module 1902 is specifically configured to: in the respective data table for the each measuring beam, use the RSRP value measured by the each measuring beam as the numerical value for a first cell corresponding to a receiving direction of the each measuring beam; determine, according to the RSRP value measured by the each measuring beam, a numerical value for a second cell in the data table, the second cell corresponding to other directions except for the receiving direction of the each measuring beam; and In embodiments, rows in the data table may correspond to vertical angles and columns in the data table may correspond to horizontal angles; or, rows in the data table may correspond to horizontal angles and columns in the data table may correspond to vertical angles.

In one possible implementation, when, in the respective data table for the each measuring beam, using the RSRP value measured by the each measuring beam as the numerical value for a first cell corresponding to a direction of the each measuring beam, and determining, according to the RSRP value measured by the each measuring beam, a numerical value for a second cell in the data table, the processing module 1902 is specifically configured for: determining the size of the data table, determining the respective first cell in the data table according to a vertical angle and a horizontal angle in the receiving direction of the each measuring beam, and using the RSRP value measured by the each measuring beam as the numerical value for the first cell; and determining, based on a preset distribution pattern, the numerical value for the second cell in the data table according to the RSRP value measured by the each measuring beam, a difference between a vertical angle for the second cell and the vertical angle in the receiving direction of the each measuring beam, a difference between a horizontal angle for the second cell and the horizontal angle in the receiving direction of the each measuring beam, and preset beam offset.

In one possible implementation, when determining a numerical value for each cell in the respective data table according to the RSRP value measured by the each measuring beam, the processing module 1902 is specifically configured to: determine an initial data table corresponding to the each measuring beam; and update, according to the RSRP value measured by the each measuring beam, an initial numerical value for the first cell in the initial data table and an initial numerical value for the second cell in the initial data table, wherein, the first cell is a cell, corresponding to the receiving direction of the each measuring beam, in the initial data table, and the initial numerical value for the first cell is a predetermined numerical value; and the second cell is a cell, corresponding to other directions except for the receiving direction of the each measuring beam, in the initial data table, and the initial numerical value for the second cell is a numerical value determined according to the predetermined numerical value, the difference between the vertical angle for the second cell and the vertical angle for the first cell, the difference between the horizontal angle for the second cell and the horizontal angle for the first cell, and the preset beam offset.

In one possible implementation, the device 1900 further includes a determination module configured to determine beam offset. In embodiments, when determining beam offset, the determination module is specifically configured to: determine, according to the receiving beams for the UE, an average of included angles between beam center directions of each two adjacent receiving beams; and use half of the average as the beam offset.

In one possible implementation, when updating, according to the RSRP value measured by the each measuring beam, an initial numerical value for the first cell in the initial data table and an initial numerical value for the second cell in the initial data table, the processing module 1902 is configured to increase the initial numerical value for the first cell in the initial data table and the initial numerical value for the second cell in the initial data table by the RSRP value measured by the each measuring beam, respectively.

In one possible implementation, the first cell is a central point of the preset distribution pattern; and the preset distribution pattern includes Gaussian distribution.

In one possible implementation, the receiving module 1903 is configured to determine a prediction result according to the data table, and perform signal reception according to the prediction result; wherein determining a prediction result includes at least one of the following: determining an optimal receiving beam; determining whether a currently activated receiving beam is in a mismatched state; determining whether to switch the receiving beam; determining the index of a receiving beam to switch to; determining to switch the receiving beam at a predetermined moment; and transmitting, to a base station, a set of candidates of optimal transmitting beams.

In one possible implementation, when determining a prediction result according to the data table, the receiving module 1903 is configured to determine a prediction result by a predetermined prediction network, according to the data table.

In one possible implementation, a predetermined prediction network includes a combined network of a convolutional neural network model and a recurrent neural network model, the recurrent neural network model including a long short-term memory network model.

In one possible implementation, when the UE is configured with a plurality of component carriers: the first determination module 1901 is specifically configured to: for each component carrier, receive, by the UE, a reference signal for each component carrier respectively by at least two measuring beams corresponding to the each component carrier, and determine a RSRP value measured by each measuring beam; the processing module 1902 is specifically configured to: for each component carrier, processing the RSRP value measured by each measuring beam corresponding to each component carrier as a respective data table; and the receiving module 1903 is specifically configured to: determine a prediction result according to the data table for each component carrier corresponding to each measuring beam, and perform signal reception according to the prediction result.

In one possible implementation, each component carrier corresponds to one channel in a predetermined prediction network; and when determining a prediction result according to the data table for each component carrier corresponding to each measuring beam, the receiving module 1903 is configured to receive, by channels respectively corresponding to the component carriers in the predetermined prediction network, a data table for each component carrier corresponding to each measuring beam, and obtain a respective prediction result according to the data table.

In one possible implementation, the UE receives a plurality of reference signals transmitted respectively by a plurality of transmitting beams; the first determination module 1901 is specifically configured to: for each transmitting beam, receive, by the UE, a reference signal transmitted from each transmitting beam by at least two measuring beams corresponding to each transmitting beam, and determine a RSRP value measured by each measuring beam; the processing module 1902 is specifically configured to: for each transmitting beam, process the RSRP value measured by each measuring beam corresponding to each transmitting beam as a respective data table; the receiving module 1903 is specifically configured to: determine a prediction result according to the data table for each transmitting beam corresponding to each measuring beam, and perform signal reception according to the prediction result.

In one possible implementation, each transmitting beam corresponds to one channel in a predetermined prediction network; and when determining a prediction result according to the data table for each transmitting beam corresponding to each measuring beam, the receiving module 1903 is configured to receive, by channels respectively corresponding to the transmitting beams in the predetermined prediction network, a data table for each transmitting beam corresponding to each measuring beam, and obtain a prediction result for each transmitting beam according to the data table for each transmitting beam.

In one possible implementation, the prediction result includes at least one of the following: the RSRP value for each receiving beam for the UE, received respectively on at least one transmitting beam; the ranking result of the RSRP value for each receiving beam for the UE, received respectively on at least one transmitting beam; the RSRP value for each receiving beam for the UE; the ranking result of the RSRP value for each receiving beam for the UE; a set of candidates of optimal receiving beams; and a set of candidates of optimal transmitting beams.

By the user equipment UE provided in embodiments, by processing the RSRP value measured by a measuring beam into a respective data table, the amplitude information of the measured RSRP can be utilized, and the spatial direction information of measuring beams can also be utilized well. In this way, optimal receiving beam can be determined and signal reception can be well performed, based on the RSRP values measured by partial receiving beams as well as the spatial position relation between the measuring beams, so as to maintain good communication link quality and ensure high-quality signal transmission.

It is to be noted that this embodiment is an embodiment of a device corresponding to an embodiment of a method. This embodiment may be implemented together with the embodiment of the method. Related technical details mentioned in the embodiments of the method are applicable to this embodiment and will not be repeated for simplicity. Correspondingly, related technical details mentioned in this embodiment are applicable to the embodiment of the method.

Another embodiment provides an electronic device, including a processor; and a memory configured to store machine-readable instructions that, when executed by the processor, cause the processor to perform the semi-persistent scheduling method described above.

Figure 20:
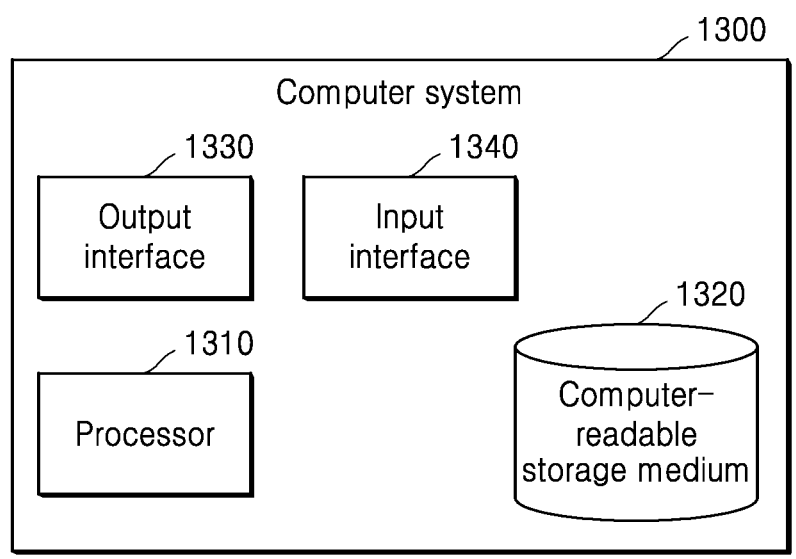
FIG. 20 is a structure diagram of an electronic device according to embodiments.

FIG. 20 schematically shows a block diagram of a computing system that can be used to implement the user equipment of the present disclosure, according to embodiments of the present disclosure.

As shown in FIG. 20, the computing system 1300 includes a processor 1310, computer-readable storage media 1320, an output interface 1330 and an input interface 1340. The computing system 1300 can perform the method described above with reference to FIG. 1, in order to carry out beam processing.

Specifically, the processor 1310 may include, for example, a general-purpose microprocessor, an instruction set processor and/or related chipset and/or dedicated microprocessor (for example, application specific integrated circuit (ASIC)), etc. The processor 1310 may further include an onboard memory used for the purpose of caching. The processor 1310 may be a single processing unit or a plurality of processing units used to perform different actions of the method described with reference to FIG. 1.

The computer-readable storage media 1320 may be, for example, any media that can contain, store, transfer, broadcast or transmit instructions. For example, the readable storage media may include but are not limited to electric, magnetic, optical, electromagnetic, infrared or semiconductor systems, apparatuses, devices or propagation media. The specific examples of the readable media include magnetic storage devices such as tapes or HDDs; optical storage devices such as CD-ROMs; memories such as RAMs or flash memories; and/or wired/wireless communication links.

The computer-readable storage media 1320 may include computer programs. The computer programs may include codes/computer-executable instructions that, when executed by the processor 1310, cause the processor 1310 to perform the method described above with reference to FIG. 1 and any variants thereof.

The computer program may be configured to have, for example, computer program codes including computer program modules. For example, in an exemplary embodiment, codes in the computer program may include one or more program modules, for example, module 1, module 2 . . . . It is to be noted that the division way and the number of modules are not fixed, and a person of ordinary skill in the art may use a proper program module or a combination of program modules according to actual requirements. The combination of the program modules, when executed by the processor 1310, causes the processor 1310 to perform the method described above with reference to FIG. 1 and any variants thereof.

According to the embodiments of the present disclosure, the processor 1310 can perform the method described above with reference to FIG. 1 and any variants thereof by using the output interface 1330 and the input interface 1340.

Figure 21:
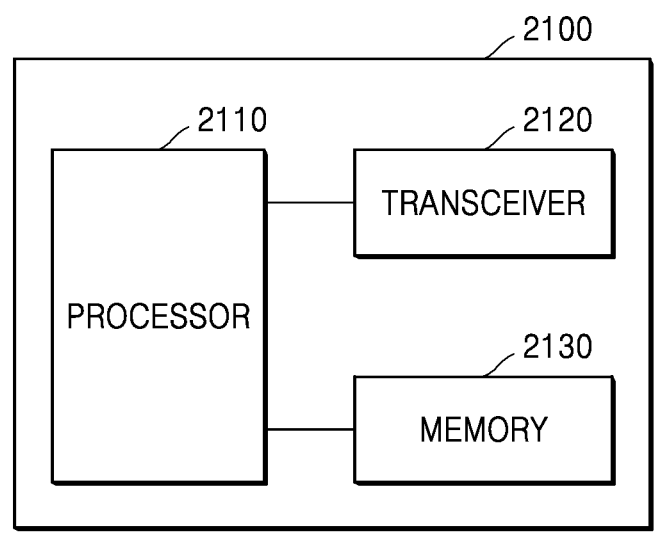
FIG. 21 illustrates a user equipment (UE) according to embodiments.

FIG. 21 illustrates a user equipment (UE) according to embodiments of the present disclosure.

Referring to the FIG. 21, the UE 2100 may include a processor 2110, a transceiver 2120 and a memory 2130. However, all of the illustrated components are not essential. The UE 2100 may be implemented by more or less components than those illustrated in FIG. 21. In addition, the processor 2110 and the transceiver 2120 and the memory 2130 may be implemented as a single chip according to another embodiment.

The UE 2100 may correspond to the UE described above. For example, UE 2100 may correspond to the device 1900 illustrated in FIG. 19.

Examples of the aforementioned components will now be described in detail.

The processor 2110 may include one or more processors or other processing devices that control the proposed function, process, and/or method. Operation of the UE 2100 may be implemented by the processor 2110.

The transceiver 2120 may include a RF transmitter for up-converting and amplifying a transmitted signal, and a RF receiver for down-converting a frequency of a received signal. However, according to another embodiment, the transceiver 2120 may be implemented by more or less components than those illustrated in components.

The transceiver 2120 may be connected to the processor 2110 and transmit and/or receive a signal. The signal may include control information and data. In addition, the transceiver 2120 may receive the signal through a wireless channel and output the signal to the processor 2110. The transceiver 2120 may transmit a signal output from the processor 2110 through the wireless channel.

The memory 2130 may store the control information or the data included in a signal obtained by the UE 2100. The memory 2130 may be connected to the processor 2110 and store at least one instruction or a protocol or a parameter for the proposed function, process, and/or method. The memory 2130 may include read-only memory (ROM) and/or random access memory (RAM) and/or hard disk and/or CD-ROM and/or DVD and/or other storage devices.

Figure 22:
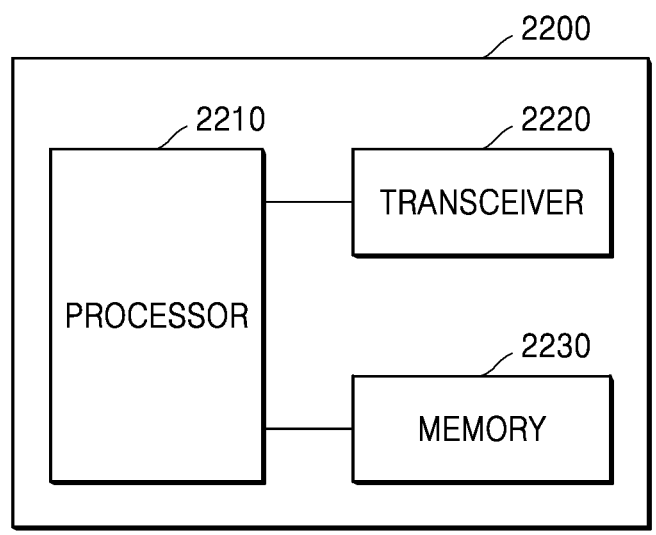
FIG. 22 illustrates a network entity according to embodiments.

FIG. 22 illustrates a network entity according to embodiments of the present disclosure.

Referring to the FIG. 22, the network entity 2200 may include a processor 2210, a transceiver 2220 and a memory 2230. However, all of the illustrated components are not essential. The network entity 2200 may be implemented by more or less components than those illustrated in FIG. 22. In addition, the processor 2210 and the transceiver 2220 and the memory 2230 may be implemented as a single chip according to another embodiment.

The network entity 2200 may correspond to the base station described above. For example, the network entity 2200 may include the base station illustrated in FIG. 15

The aforementioned components will now be described in detail.

The processor 2210 may include one or more processors or other processing devices that control the proposed function, process, and/or method. Operation of the network entity 2200 may be implemented by the processor 2210.

The transceiver 2220 may include a RF transmitter for up-converting and amplifying a transmitted signal, and a RF receiver for down-converting a frequency of a received signal. However, according to another embodiment, the transceiver 2220 may be implemented by more or less components than those illustrated in components.

The transceiver 2220 may be connected to the processor 2210 and transmit and/or receive a signal. The signal may include control information and data. In addition, the transceiver 2220 may receive the signal through a wireless channel and output the signal to the processor 2210. The transceiver 2220 may transmit a signal output from the processor 2210 through the wireless channel.

The memory 2230 may store the control information or the data included in a signal obtained by the network entity 2200. The memory 2230 may be connected to the processor 2210 and store at least one instruction or a protocol or a parameter for the proposed function, process, and/or method. The memory 2230 may include read-only memory (ROM) and/or random access memory (RAM) and/or hard disk and/or CD-ROM and/or DVD and/or other storage devices.

It should be understood that although the steps in the flowcharts shown in the drawings are sequentially displayed by following the arrows, these steps are not necessarily performed in the order indicated by the arrows. Unless explicitly stated herein, the execution order of these steps is not strictly limited, and they can be performed in other orders. Moreover, at least some of the steps in the flowcharts shown in the drawings may include multiple operations or multiple stages. These operations or stages are not necessarily performed at the same moment, and instead, may be performed at different moments of time. The operations or stages are not necessarily performed sequentially, and instead, may be performed in turn or alternately with other steps or at least some of the operations or stages of other steps.

The foregoing descriptions are merely some implementations. It should be noted that, to one of ordinary skill in the art, various improvements and modifications may be made without departing from the principle, and these improvements and modifications shall be deemed as falling into the protection scope.

What is claimed is:

1. A method of signal reception performed by a user equipment (UE), the method comprising:
   receiving at least two reference signals using at least two measuring beams, the at least two reference signals being transmitted using a same transmission beam;
   determining at least two reference signal received power (RSRP) values measured by the at least two measuring beams;
   for each measuring beam of the at least two measuring beams, determining a numerical value for a cell in a corresponding data table of at least two data tables according to a corresponding RSRP value of the at least two RSRP values; and
   performing the signal reception according to the at least two data tables,
   wherein the corresponding RSRP value is used as ea numerical value for a first cell corresponding to a receiving direction of the each measuring beam,
   wherein a numerical value for a second cell in the corresponding data table is determined based on the corresponding RSRP value, the second cell corresponding to a direction other than the receiving direction of the each measuring beam, and
   wherein rows in the corresponding data table correspond to vertical angles and columns in the corresponding data table corresponding to horizontal angles, or the rows in the corresponding data table correspond to the horizontal angles and the columns in the corresponding data table correspond to the vertical angles.

2. The method according to claim 1, wherein the at least two measuring beams are selected from among receiving beams of the UE based on a distribution of the receiving beams and a preset selection rule, or based on received configuration information.

3. The method according to claim 2, wherein the at least two measuring beams are selected by at least one of:
   selecting, from the receiving beams, the at least two measuring beams to be uniformly distributed in a spherical space centered on an antenna array of the UE; and
   selecting, from the receiving beams, the at least two measuring beams to correspond to a normal direction of the antenna array.

4. The method according to claim 1, wherein the at least two reference signals comprise at least one of:

a synchronization signal in a synchronization signal block; and a channel state information reference signal.

5. The method according to claim 1, further comprising:
determining a size of the corresponding data table
determining the first cell in the corresponding data table according to a vertical angle of the receiving direction and a horizontal angle of the receiving direction of the each measuring beam;
using the corresponding RSRP value as the numerical value for the first cell;
determining, based on a preset distribution pattern, the numerical value for the second cell in the corresponding data table according to the corresponding RSRP value, a difference between a vertical angle for the second cell and the vertical angle of the receiving direction of the each measuring beam, a difference between a horizontal angle for the second cell and the horizontal angle of the receiving direction of the each measuring beam, and a preset beam offset.

6. The method according to claim 1, further comprising:
determining an initial data table corresponding to the each measuring beam; and
updating, according to the corresponding RSRP value, an initial numerical value for a first cell in the initial data table and an initial numerical value for a second cell in the initial data table,
wherein, the first cell is a cell corresponding to a receiving direction of the each measuring beam, in the initial data table, and the initial numerical value for the first cell is a predetermined numerical value; and
wherein the second cell is a cell corresponding to a direction other than the receiving direction of the each measuring beam, in the initial data table, and the initial numerical value for the second cell is a numerical value determined according to the predetermined numerical value, a difference between a vertical angle for the second cell and a vertical angle for the first cell, a difference between a horizontal angle for the second cell and a horizontal angle for the first cell, and a preset beam offset.

7. The method according to claim 6, wherein the updating, according to the corresponding RSRP value, the initial numerical value for the first cell in the initial data table and the initial numerical value for the second cell in the initial data table comprises:
increasing the initial numerical value for the first cell in the initial data table and the initial numerical value for the second cell in the initial data table by the corresponding RSRP value.

8. The method according to claim 1, wherein the first cell is a central point of a preset distribution pattern; and the preset distribution pattern comprises a Gaussian distribution.

9. The method according to claim 1, wherein the performing the signal reception according to the at least two data tables comprises:
determining a prediction result according to the at least two data tables, and performing the signal reception according to the prediction result,
wherein, the determining of the prediction result comprises at least one of:
determining an optimal receiving beam;
determining whether a currently activated receiving beam is in a mismatched state;
determining whether to switch a receiving beam;
determining an index of a candidate receiving beam;

determining to switch the receiving beam at a predetermined time; and
transmitting, to a base station, a set of candidates of optimal transmitting beams.

10. The method according to claim 9,
wherein the prediction result is determined using a predetermined prediction network according to the at least two data tables.

11. The method according to claim 10, wherein the predetermined prediction network comprises a combined network based on a convolutional neural network model and a recurrent neural network model,
wherein the recurrent neural network model comprises long short-term memory network model.

12. The method according to claim 1, wherein, based on the UE being configured with a plurality of component carriers, the at least two reference signals are received for the plurality of component carriers of the plurality of component carriers, the at least two RSRP values are processed as the at least two data tables according to the plurality of component carriers, a prediction result is determined for the plurality of component carriers based on the at least two data tables, and the signal reception is performed based on the prediction result.

13. The method according to claim 12,
wherein each component carrier of the plurality of component carriers corresponds to a channel of a predetermined prediction network, and
wherein the prediction result is determined by receiving, by the channel corresponding to the each component carrier, a data table for the each component carrier corresponding to each measuring beam of the at least two measuring beams, and obtaining the prediction result according to the data table.

14. The method according to claim 1,
wherein the UE receives a plurality of reference signals transmitted by a plurality of transmitting beams,
wherein, for each transmitting beam of the plurality of transmitting beams, the at least two reference signals are transmitted using the each transmitting beam and is received by the at least two measuring beams,
wherein the at least two RSRP values are processed as the at least two data tables for the each transmitting beam, and
wherein a prediction result is determined according to the at least two data tables for the each transmitting beam, and
wherein the signal reception is performed according to the prediction result.

15. The method according to claim 14,
wherein the each transmitting beam corresponds to a channel of a predetermined prediction network,
wherein the prediction result is determined by: receiving, by the channel corresponding to the each transmitting beam of the predetermined prediction network, a data table for the each transmitting beam corresponding to each measuring beam of the at least two measuring beams, and obtaining the prediction result according to the data table.

16. The method according to claim 14,
wherein the prediction result comprises at least one of:
a respective RSRP value for each receiving beam of the UE received on at least one transmitting beam;
a respective ranking result of the RSRP value for the each receiving beam, received on the at least one transmitting beam;
the RSRP value for each receiving beam for the UE;

the ranking result of the RSRP value for the each receiving beam;
a set of candidates of optimal receiving beams; and
a set of candidates of optimal transmitting beams.

17. A user equipment for signal reception, comprising:
a transceiver; and
a processor coupled with the transceiver and configured to:
receive at least two reference signals using at least two measuring beams, the at least two reference signals being transmitted using a same transmission beam,
determine a plurality of reference signal received power (RSRP) values measured by the at least two measuring beams,
for each measuring beam of the at least two measuring beams, determine a numerical value for a cell in a corresponding data table of at least two data tables according to a corresponding RSRP value of the at least two RSRP values, and
perform the signal reception according to the at least two data tables,
wherein the corresponding RSRP value is used as a numerical value for a first cell corresponding to a receiving direction of the each measuring beam,
wherein a numerical value for a second cell in the corresponding data table is determined based on the corresponding RSRP value, the second cell corresponding to a direction other than the receiving direction of the each measuring beam, and
wherein rows in the corresponding data table correspond to vertical angles and columns in the corresponding data table corresponding to horizontal angles, or the rows in the corresponding data table correspond to the horizontal angles and the columns in the corresponding data table correspond to the vertical angles.

18. A computer program product comprising a non-transitory computer-readable recording medium configured to store instructions which, when executed by at least one processor of a device for signal reception, cause the at least one processor to:
receive at least two reference signals using at least two measuring beams, the at least two reference signals being transmitted using a same transmission beam,
determine a plurality of reference signal received power (RSRP) values measured by the at least two measuring beams,
for each measuring beam of the at least two measuring beams, determine a numerical value for a cell in a corresponding data table of at least two data tables according to a corresponding RSRP value of the at least two RSRP values, and
perform the signal reception according to the at least two data tables,
wherein the corresponding RSRP value is used as a numerical value for a first cell corresponding to a receiving direction of the each measuring beam,
wherein a numerical value for a second cell in the corresponding data table is determined based on the corresponding RSRP value, the second cell corresponding to a direction other than the receiving direction of the each measuring beam, and
wherein rows in the corresponding data table correspond to vertical angles and columns in the corresponding data table corresponding to horizontal angles, or the rows in the corresponding data table correspond to the horizontal angles and the columns in the corresponding data table correspond to the vertical angles.

* * * * *